(12) United States Patent
Boivie et al.

(10) Patent No.: US 11,429,590 B2
(45) Date of Patent: Aug. 30, 2022

(54) PROTECTING AGAINST INVALID MEMORY REFERENCES

(71) Applicant: International Business Machines Corporation, Armonk, NY (US)

(72) Inventors: Richard H. Boivie, Monroe, CT (US); Tong Chen, Yorktown Heights, NY (US); Alper Buyuktosunoglu, White Plains, NY (US); Gururaj Saileshwar, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/071,257

(22) Filed: Oct. 15, 2020

(65) Prior Publication Data
US 2022/0121644 A1    Apr. 21, 2022

(51) Int. Cl.
*G06F 16/22* (2019.01)
*G06F 16/23* (2019.01)

(52) U.S. Cl.
CPC ...... *G06F 16/2365* (2019.01); *G06F 16/2282* (2019.01)

(58) Field of Classification Search
None
See application file for complete search history.

(56) References Cited

U.S. PATENT DOCUMENTS

| 8,635,415 B2 | 1/2014 | Patel et al. | |
| 10,162,694 B2 | 12/2018 | Stark et al. | |
| 2004/0068627 A1* | 4/2004 | Sechrest | G06F 12/121 711/158 |
| 2009/0077097 A1* | 3/2009 | Lacapra | G06F 16/119 |
| 2011/0167222 A1* | 7/2011 | Lee | G06F 9/3004 711/118 |
| 2013/0054546 A1* | 2/2013 | Solihin | G06F 12/1009 707/693 |
| 2014/0181386 A1* | 6/2014 | Sadowski | G06F 12/0246 711/105 |
| 2014/0282312 A1* | 9/2014 | Stamness | G06F 30/327 716/106 |
| 2014/0283040 A1* | 9/2014 | Wilkerson | G06F 21/52 726/22 |

(Continued)

OTHER PUBLICATIONS

Devietti et al., "HardBound: Architectural Support for Spatial Safety of the C Programming Language," ASPLOS'08, Mar. 1-5, 2008, Seattle, Washington, USA. (2008), 12 pages.

(Continued)

*Primary Examiner* — Wilson Lee

(74) *Attorney, Agent, or Firm* — Amin, Turocy & Watson, LLP

(57) ABSTRACT

Techniques facilitating hardware-based memory-error mitigation for heap-objects. In one example, a system can comprise a process that executes computer executable components stored in a non-transitory computer readable medium. The computer executable components comprise: an entry component; and a re-purpose component. The entry component can allocate an entry in a table to store bounds-information when an object is allocated in memory. The re-purpose component can re-purpose unused bits of an object address to store an index to the table entry.

24 Claims, 22 Drawing Sheets

(56) References Cited

U.S. PATENT DOCUMENTS

| | | | |
|---|---|---|---|
| 2016/0147466 | A1 | 5/2016 | Yazdani et al. |
| 2016/0170884 | A1* | 6/2016 | Eddy .................. G06F 12/0864 711/122 |
| 2017/0153926 | A1* | 6/2017 | Callegari .............. G06F 9/5044 |
| 2017/0344489 | A1* | 11/2017 | Kapoor ............... G06F 12/1009 |
| 2018/0095720 | A1 | 4/2018 | Gopal et al. |
| 2018/0232313 | A1* | 8/2018 | Nikoleris ............ G06F 12/0811 |
| 2018/0255589 | A1* | 9/2018 | Patil .................. H04W 74/0875 |
| 2019/0303263 | A1* | 10/2019 | Fleming, Jr. .......... G06F 11/348 |
| 2019/0356412 | A1* | 11/2019 | Pitigoi-Aron ......... H04L 1/0041 |
| 2020/0034071 | A1* | 1/2020 | Gonzalez .......... G06F 16/24568 |
| 2020/0125497 | A1 | 4/2020 | Shi et al. |
| 2020/0379809 | A1* | 12/2020 | Yudanov ............. G06F 12/1036 |
| 2020/0379908 | A1* | 12/2020 | Curewitz ............ G06F 12/1009 |
| 2021/0234507 | A1* | 7/2021 | Pozsgay ................... H04B 3/56 |

OTHER PUBLICATIONS

Nagarakatte et al., "WatchdogLite: Hardware-Accelerated Compiler-Based Pointer Checking," CGO '14 Feb. 15-19, 2014, Orlando, FL, USA (2014), 10 pages.

Kosmatov et al., "An optimized memory monitoring for runtime assertion checking of C programs," International Conference on Runtime Verification. Springer, Berlin, Heidelberg, 2013, 19 pages.

Kwon et al. "Low-Fat Pointers: Compact Encoding and Efficient Gate-Level Implementation of Fat Pointers for Spatial Safety and Capability-based Security," CCS'13, Nov. 4-8, 2013, Berlin, Germany, 13 pages.

Akritidis et al. "Baggy Bounds Checking: An Efficient and Backwards-Compatible Defense against Out-of-Bounds Errors," USENIX Security Symposium. 2009, 50 pages.

Brunink et al., "Boundless memory allocations for memory safety and high availability," 2011 IEEE/IFIP 41st International Conference on Dependable Systems & Networks (DSN). IEEE, 2011, 12 pages.

"2019 CWE Top 25 Most Dangerous Software Errors," https://cwe.mitre.org/top25/archive/2019/2019_cwe_top25.html, 2019, 7 pages.

Berger et al., "DieHard: Probabilistic Memory Safety for Unsafe Languages," Acm sigplan notices, 41(6):158-168, 2006, 11 pages.

"Standard Performance Evaluation Corporation. Spec cpu 2017," https://www.spec.org/cpu2017/, 2 pages.

Duck et al., "Heap Bounds Protection with Low Fat Pointers," In Proceedings of the 25th International Conference on Compiler Construction, 2016, 11 pages.

Duck et al., "Stack Bounds Protection with Low Fat Pointers," In NDSS, Feb. 27, 2017, 15 pages.

"Eclypsium. There's a Hole in the Boot—Boothole," https://eclypsium.com/2020/07/29/theres-a-hole-in-the-boot/, Jul. 29, 2020, 16 pages.

Jim et al., "Cyclone: A safe dialect of C," In USENIX Annual Technical Conference, General Track, 2002, 14 pages.

Lowe-Power et al., "The gem5 Simulator: Version 20.0+," arXiv:2007.03152v1 [cs.AR] Jul. 7, 2020, 20 pages.

Miller, "SSTIC-2020. Pursuing Durably Safe Systems Software," https://github.com/microsoft/MSRC-Security-Research/tree/master/presentations/2020_06_SSTIC, 2020, 16 pages.

Nagarakatte et al., "Watchdog: Hardware for Safe and Secure Manual Memory Management and Full Memory Safety," In 2012 39th Annual International Symposium on Computer Architecture (ISCA), IEEE, 2012, 12 pages.

Nagarakatte et al., "SoftBound: highly compatible and complete spatial memory safety for c," In Proceedings of the 30th ACM SIGPLAN Conference on Programming Language Design and Implementation, 2009, 14 pages.

Nagarakatte et al., "CETS: Compiler-Enforced Temporal Safety for C," In Proceedings of the 2010 international symposium on Memory management, 2010, 10 pages.

Necula et al., "CCured Type-Safe Retrofitting of Legacy Code," In Proceedings of the 29th ACM SIGPLAN-SIGACT symposium on Principles of programming languages, 2002, 12 pages.

Oleksenko et al., "Intel MPX Explained: A Cross-layer Analysis of the Intel MPX System Stack," Proceedings of the ACM on Measurement and Analysis of Computing Systems, 2(2):1-30, Jun. 2018, 30 pages.

"Oracle—Hardware-Assisted Checking Using Silicon Secured Memory (SSM)," https://docs.oracle.com/cd/E37069_01/html/E37085/gphwb.html, 2015, 9 pages.

Orman, "The Morris Worm: A Fifteen-Year Perspective," IEEE Security & Privacy, 1(5):35-43, 2003, 9 pages.

Phillips, "AddressSanitizerAlgorithm," https://github.com/google/sanitizers/wiki/AddressSanitizerAlgorithm, 2017, 7 pages.

Roemer et al., "Return-Oriented Programming: Systems, Languages, and Applications," ACM Transactions on Information and System Security (TISSEC), 15(1):1-34, 2012, 42 pages.

Sasaki et al., "Practical Byte-Granular Memory Blacklisting using Califorms," In Proceedings of the 52nd Annual IEEE/ACM International Symposium on Microarchitecture, 2019, 14 pages.

Serebryany et al., "AddressSanitizer: A Fast Address Sanity Checker," Presented as part of the 2012 USENIX Annual Technical Conference (USENIX ATC 12), 2012, 10 pages.

Serebryany, "Oss-fuzz—google's continuous fuzzing service for open source software," Vancouver, BC, Aug. 2017. USENIX Association, 28 pages.

Serebryany et al., "Adopting the Arm Memory Tagging Extension in Android," https://security.googleblog.com/2019/08/adopting-arm-memory-tagging-extension.html, Aug. 2, 2019, 4 pages.

Sethumadavan, "Blacklisting vs Whitelisting for memory safety," https://developer.arm.com/-/media/Files/ResearchSummit19/1C_02_SimhaSethumadhaven.pdf, ARM Research Summit, 2019, 36 pages.

Sharifi et al., "CHEx86: Context-Sensitive Enforcement of Memory Safety via Microcode-Enabled Capabilities," 2020 ACM/IEEE 47th Annual International Symposium on Computer Architecture (ISCA), pp. 762-775. IEEE, 2020, 14 pages.

Sinha et al., "Practical Memory Safety with REST," 2018 ACM/IEEE 45th Annual International Symposium on Computer Architecture (ISCA), IEEE, 2018, 12 pages.

Szekeres et al., "SoK: Eternal War in Memory," 2013 IEEE Symposium on Security and Privacy, IEEE, 2013, 15 pages.

Woodruff et al., "CHERI Concentrate: Practical Compressed Capabilities," IEEE Transactions on Computers, 68(10):1455-1469, 2019, 15 pages.

Woodruff et al., "The CHERI capability model: Revisiting RISC in an age of risk," In 2014 ACM/IEEE 41st International Symposium on Computer Architecture (ISCA), IEEE, Jun. 2014, 12 pages.

Xia et al., "CHERIvoke: Characterising Pointer Revocation using CHERI Capabilities for Temporal Memory Safety,". In Proceedings of the 52nd Annual IEEE/ACM International Symposium on Microarchitecture, MICRO '52, 2019, 13 pages.

Younan et al., "PAriCheck: An Efficient Pointer Arithmetic Checker for C Programs," In Proceedings of the 5th ACM Symposium on Information, Computerand Communications Security, 2010, 12 pages.

Zhang et al., "BOGO: Buy Spatial Memory Safety, Get Temporal Memory Safety (Almost) Free," In Proceedings of the Twenty-Fourth International Conference on Architectural Support for Programming Languages and Operating Systems, 2019, 14 pages.

Serebryany et al., "Memory Tagging and how it improves C/C++ memory safety," arXiv:1802.09517 [cs.CR], 2018, 14 pages.

"Protecting Against Out-of-Bounds Buffer References," U.S. Appl. No. 16/601,633, filed Oct. 14, 2019.

GITHUB.IO, "Design of Intel MPX," https://intel-mpx.github.io/design/, Retrieved from the Internet: Apr. 21, 2022.

SAMATE.NIST.GOV, "Buffer Overflow (BOF) Examples," https://samate.nist.gov/BF/Examples/BOF.html, Retrieved from the Internet: Apr. 21, 2022.

DEVELOPER.ARM.COM, "Armv8.5—A Memory Tagging Extension," https://developer.arm.com/-/media/Arm%20Developer%20Community/PDF/Arm_Memory_Tagging_Extension_Whitepaper.pdf, Aug. 5, 2019.

Bigham, "Calling free() on a NULL pointer," http://www.manticmoo.com/articles/jeff/programming/c/free-with-null-pointer.php, Retrieved from the Internet: Apr. 21, 2022.

(56) References Cited

OTHER PUBLICATIONS

GITHUB.COM, "shellphish/how2heap," https://github.com/shellphish/how2heap, Retrieved from the Internet: Apr. 21, 2022.
Combined Search and Examination Report under Sections 17 and 18(3) received for G.B. Patent Application Serial No. 2113829.2 dated Jun. 6, 2022, 9 pages.

* cited by examiner

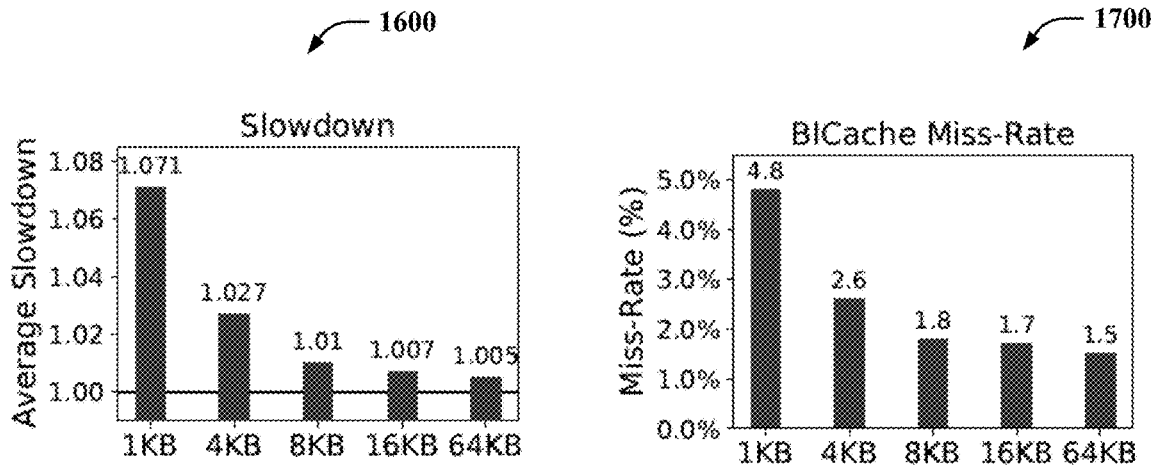
FIG. 16  FIG. 17
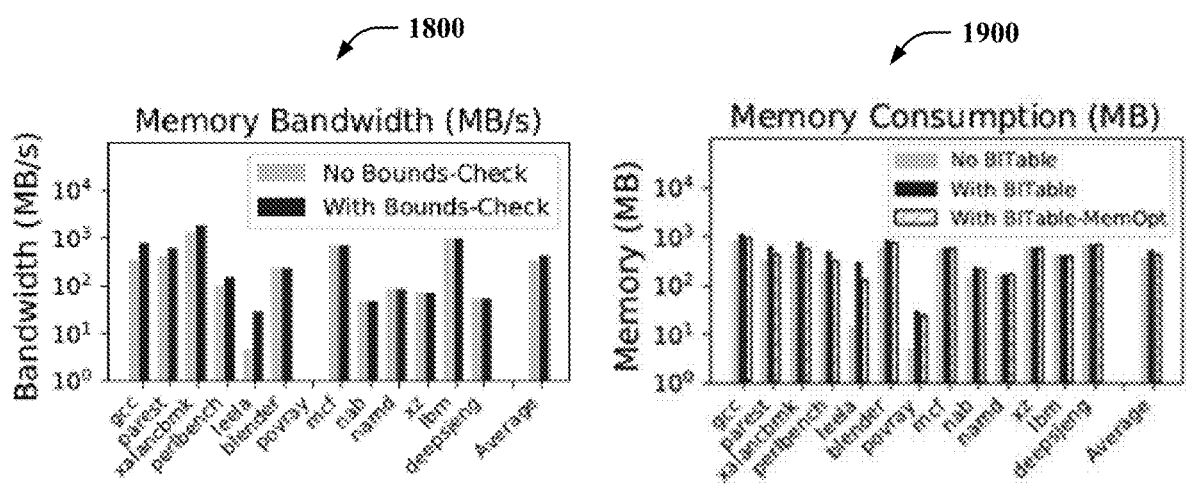
FIG. 18  FIG. 19

PROTECTING AGAINST INVALID MEMORY REFERENCES

BACKGROUND

The subject disclosure relates to computing devices, and more specifically, to techniques of facilitating hardware-based memory-error mitigation for heap-objects.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate hardware-based memory-error mitigation for heap-objects are described.

According to an embodiment, a system can comprise a process that executes computer executable components stored in a non-transitory computer readable medium. The computer executable components comprise: an entry component; and a re-purpose component. The entry component can allocate an entry in a table to store bounds-information when an object is allocated in memory. The re-purpose component can re-purpose unused bits of an object address to store an index to the table entry.

According to another embodiment, a computer-implemented method can comprise allocating, using a processor, an entry in a table to store bounds-information when an object is allocated in memory. The computer-implemented method can further comprise re-purposing, using the processor, unused bits of an object address to store an index to the table entry.

According to another embodiment, a computer program product can comprise a computer readable storage medium having program instructions embodied therewith. The program instructions are executable by a processor to cause the processor to perform operations. The operations include allocating an entry in a table to store bounds-information when an object is allocated. The operations further include re-purposing unused bits of an object address to store an index to the table entry.

DESCRIPTION OF THE DRAWINGS

FIG. 16 illustrates an example, non-limiting chart depicting average slowdowns associated with bounds-checks as BICache size varies, in accordance with one or more embodiments described herein.

FIG. 17 illustrates an example, non-limiting chart depicting BICache miss-rates as BICache size varies, in accordance with one or more embodiments described herein.

FIG. 18 illustrates an example, non-limiting chart depicting memory bandwidth overhead associated with bounds-checks, in accordance with one or more embodiments described herein.

FIG. 19 illustrates an example, non-limiting chart depicting memory bandwidth overhead associated with a BITable, in accordance with one or more embodiments described herein.

DETAILED DESCRIPTION

Figure 1:
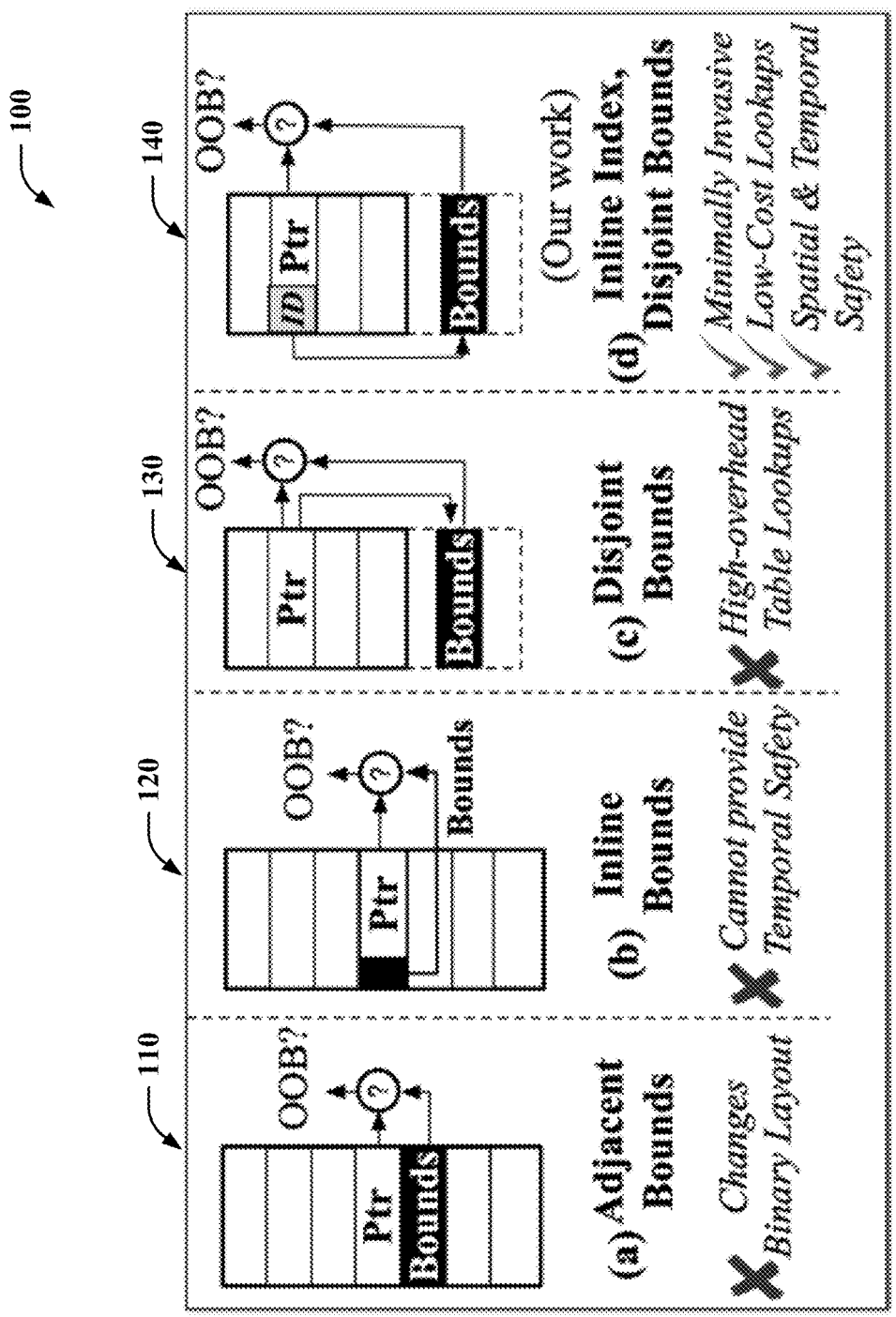
FIG. 1 illustrates an example, non-limiting grouping of bounds-checking based techniques based on a location of their respective bounds-metadata, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Applications written in memory-unsafe languages like C or C++, that utilize user-code to explicitly manage memory, are vulnerable to memory-safety errors like buffer-overflows, use-after-free, and others. Such errors have previously been exploited in numerous attacks, including high-profile attacks, such as the Morris worm and Heartbleed. Moreover, such errors are ranked by MITRE to be some of the most dangerous software bugs. A recent study by one technology company revealed that such errors continue to be the root cause of approximately 70% of the Common Vulnerabilities and Exposures (CVEs) identified in their production-software. In particular, errors specific to heap objects, including heap corruption, out-of-bounds accesses, and use-after-free, caused almost 50% of the CVEs in 2019.

To date, numerous solutions have been proposed to detect or prevent such errors, that can broadly be classified as black-listing or white-listing based. Black-listing based approaches prevent (some) unsafe locations from being accessed (e.g. by inserting trip-wires around objects), and typically face fewer barriers to adoption such as prohibitive performance overhead or invasive changes to the program source-code. However, black-listing based approaches lack complete coverage, allowing errors to remain undetected, free to be exploited in the wild. In contrast, white-listing based approaches enforce safe program behavior based on authorization (e.g. bounds-checking mechanisms that verify that all pointer defererences are within object-bounds) and allow more precise enforcement of spatial and temporal memory-safety. However, white-listing based approaches often incur prohibitive slowdown that can range from 24% to 116% slowdown. Moreover, white-listing based approaches often require disruptive changes to source-code or binary-layout, making them difficult to adopt. Ideally, a practical solution for memory safety involves the strong security of white-listing based approaches, but without their performance or compatibility drawbacks.

As discussed above, applications written in C/C++, where pointer manipulation is permissible without safety-checks, are prone to memory-errors where pointers dereference invalid memory regions. A spatial error (out-of-bounds access) can arise from pointer-arithmetic using unvalidated inputs that causes a buffer-pointer to access memory beyond the buffer-bounds. Similarly, a temporal error (e.g. use-after-free) can result from a read or write using a dangling pointer (a pointer to a freed object whose memory has been subsequently re-used). Memory leakage and corruption due to such errors has been exploited by attacks that break data-confidentiality, attempt privilege escalation, break system-integrity, and the like. Enforcing memory safety and preventing memory errors can facilitate preventing such attacks on production-software. Various techniques can be implemented to enforce memory safety and prevent memory errors.

Such techniques include probabilistic techniques that can either use trip-wires, randomization, or tagged-memory to probabilistically detect memory accesses that cross object-bounds. One example of a trip-wire based technique includes AddressSanitizer (ASAN) provided by Google LLC of Mountain View, Calif. Trip-wire based techniques generally insert red-zones or trip-wires around objects to detect common spatial bugs that go beyond object-bounds by a small amount. One example of a randomization based technique includes DieHard. Randomization based techniques generally randomize the memory layouts with the support of the memory-allocator to make bugs easy to detect. One example of a hardware-based memory-tagging technique includes Memory Tagging Extension (MTE) provided by Arm Limited of Cambridge, England. Hardware-based memory-tagging techniques generally assign random 4-bit tags or "colors" to object-pointer pairs to facilitate probabilistically detecting bugs based on "color" mismatches. While relatively easy to adopt due to minimal slowdown or compatibility issues, probabilistic techniques may be unable to provide complete coverage for error-detection by design.

Such techniques can also include bounds-checking based techniques that can provide precise enforcement of safe program behavior by tracking the object base and bounds and enforcing bounds-checks on all object accesses. As illustrated in FIG. 1, bounds-checking based techniques 100 can be grouped based on the location of their respective bounds-metadata. For example, bounds-checking based techniques 100 include an adjacent bounds group 110 that comprises fat-pointer based techniques like CCured and Cyclone. Fat-pointer based techniques can store the base and bounds metadata in separate words alongside the actual pointer value. Such storage of the base and bounds metadata facilitates allowing execution of a bounds-check to detect spatial errors when the actual pointer is dereferenced. In a similar vein, some instances of fat-pointer based techniques can replace pointers with 256-bit "capabilities" that can include the address, bounds-information, permission bits and other metadata required to facilitate enforcing fine-grain compartmentalization along with bounds-checking. Unfortunately, the adjacent bounds group 110 of bounds-checking based techniques generally involve changes to the source code and also changes to the binary layout impacting compatibility with library code.

An inline bounds group 120 of bounds-checking based techniques comprising Low-Fat-pointer based techniques provides another example. Low-Fat-pointer based techniques can encode the object-bounds inline within the pointer, without impacting binary layout. One instance of a low-fat-pointer based technique can use a compact floating-point format to store (the least significant bits of) the object base and bounds addresses in the top 18 bits of a 64-bit pointer. Other instances of low-fat-pointer based techniques can allocate objects in size-specific partitions of memory at a size-aligned base-address, to implicitly encode the base and bounds in the pointer-value. These instances of low-fat-pointer based techniques can track pointer-arithmetic (either in hardware or via explicit instructions inserted by compiler/instrumentation) to ensure that the pointer never crosses the inline-bounds. Unfortunately, the inline bounds group 120 of bounds-checking based techniques generally do not provide temporal safety, as the inserted checks that use the bounds within a dangling pointer continue to pass, even after the memory it references is re-used.

A disjoint bounds group 130 of bounds-checking based techniques provides another example. Bounds-checking based techniques within the disjoint bounds group 130 can store bounds-metadata (per pointer or per object) in a disjoint table in shadow-memory to avoid changing the binary layout. The bounds-table is typically indexed using the pointer-value, as a linear table lookup or using a multi-level trie lookup. Such bounds-checking based techniques can detect spatial errors (some designs also detect temporal errors) by executing a bounds-check with a table-lookup (inserted by software or implicitly by hardware) on pointer-dereferences or on all pointer-arithmetic. Purely software-based techniques within the disjoint bounds group 130 that involve extra instructions to propagate bounds-metadata on pointer-arithmetic and for table-lookups can incur high performance overheads (e.g., ~50%-112% on average). Hardware-based techniques within the disjoint bounds group 130 can incur lower overheads compared to the software-based techniques by propagating bounds and executing checks using micro-code or dedicated hardware. However, such hardware-based techniques can continue to incur moderate-to-high slowdown due to expensive table-lookups using the pointer-value, to access the bounds-metadata.

Unlike the various memory safety techniques discussed above, implementations of the present disclosure involve a hardware-based bounds-checker that can precisely enforce object-bounds to prevent spatial errors. Embodiments of the hardware-based bounds-checking framework facilitates efficiently invalidating bounds for dangling pointers to detect temporal errors. For practical adoption, embodiments of this hardware-based bounds-checking framework comprises low performance overheads and avoids changes to the binary layout. To that end, implementations of the present disclosure involve a bounds-metadata design that can associate a pointer with a unique inline identifier that can be used to index into a disjoint bounds table. One or more implementations of the present disclosure comprise an inline index, disjoint bounds group 140 of bounds-checking based techniques.

Figure 2:
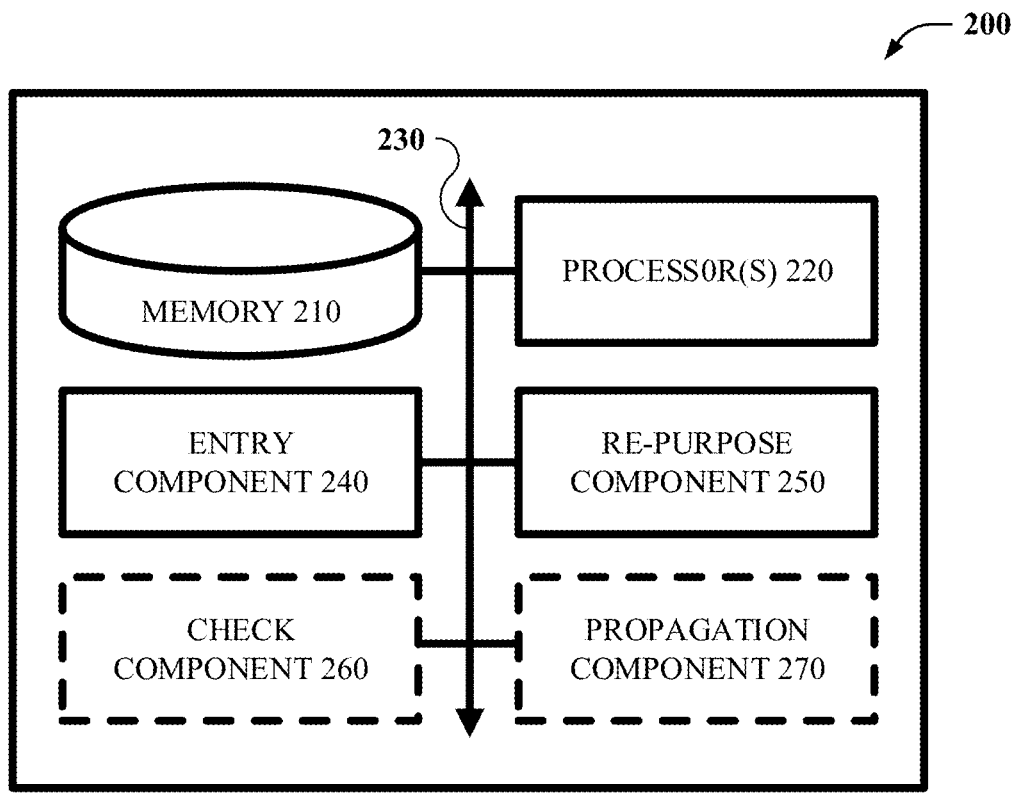
FIG. 2 illustrates a block diagram of an example, non-limiting system that can facilitate hardware-based memory-error mitigation for heap-objects, in accordance with one or more embodiments described herein.

FIG. 2 illustrates a block diagram of an example, non-limiting system 200 that can facilitate memory-error mitigation for heap-objects, in accordance with one or more embodiments described herein. System 200 includes non-transitory computer readable storage medium (storage medium) 210 for storing computer-executable components and one or more processors 220 operably coupled via one or more communication busses 230 to storage medium 210 for executing the computer-executable components stored in storage medium 210. As shown in FIG. 2, the computer-executable components include: entry component 240 and re-purpose component 250.

Entry component 240 can allocate an entry in a table to store bounds-information when an object is allocated in memory. Re-purpose component 250 can re-purpose unused bits of an object address to store an index to the table entry. In an embodiment, re-purpose component 250 can utilize un-used bits in the object address to track a range of memory addresses that can be accessed.

In an embodiment, the computer-executable components stored in storage medium 210 can further include check component 260. Check component 260 can execute bounds-checking in hardware on load and store instructions by using index bits in an address to access the bounds-information. In an embodiment, check component 260 can check array bounds. In an embodiment, check component 260 can determine if an array reference is in-bounds or out-of-bounds and mitigates occurrence of out-of-bounds array references.

In an embodiment, the computer-executable components stored in storage medium 210 can further include propagation component 270. Propagation component 270 can automatically propagate the index when subsequent object addresses are derived via assignment statements or pointer arithmetic. In an embodiment, propagation component 270 can propagate extra information in unused bits when the object address is copied in an assignment statement. In an embodiment, propagation component 270 can propagate extra information in unused bits when the object address is passed as an argument in a function call. In an embodiment, propagation component 270 can propagate extra information in unused bits when the object address is used to compute an address. The functionality of the computer-executable components utilized by the embodiments will be covered in greater detail below.

The following disclosure presents a low-cost and minimally invasive framework for bounds-checking in hardware. The disclosed techniques involve a hardware-enabled pointer bounds-checking framework, for low-cost yet precise enforcement of memory safety for heap-objects. In an embodiment, the disclosed bounds-checking framework for heap-objects can be implemented using LLVM-instrumentation to replace malloc/free calls in programs with custom library-functions for maintaining bounds-information.

As discussed in greater detail below, implementations of the disclosed techniques facilitate mitigating memory-errors for heap-objects using precise enforcement of object-bounds on pointer-dereferences, to prevent out-of-bounds access and use-after-free errors. The disclosed techniques facilitate precise enforcement of such object-bounds while ensuring minimal performance impact and can be implemented with no changes to source-code or binary layout. Embodiments of the disclosed techniques can mitigate memory-errors for heap-objects by re-thinking hardware-enforced bounds-checking in a vertically integrated hardware/software (HW/SW) eco-system, with minimal changes to C/C++ memory-allocation functions, instruction set architecture (ISA), and hardware.

One aspect of the disclosed techniques involves re-purposing the "unused bits" in a pointer to check or keep track of a range of addresses that can be legitimately accessed via the pointer. In 64-bit architectures, object-pointers have unused bits, as they generally store virtual-addresses with 48-bits of information or less. The disclosed techniques can leverage these unused bits to: (a) allocate an entry in a bounds-table to store the bounds-information when an object is allocated; (b) re-purpose the unused bits (e.g., top-bits) of the object-pointer to store the index to the bounds-table entry; (c) automatically propagate the index when subsequent addresses are derived via assignment statements or pointer arithmetic; and/or (d) execute bounds-checking in hardware on load and store instructions by using the index bits in an address to access the appropriate bounds-information.

By leveraging these unused bits, the disclosed techniques facilitate a spatial and temporal safety solution for heap-objects, that prevents errors like heap out-of-bounds reads and writes, and use-after-free. In addition to mitigating heap-errors, one or more embodiments of the disclosed techniques are also generally applicable to memory safety for globals and stack-objects. Preventing such errors can be desirable because they make up almost 50% of the CVEs discussed above with respect to the technology company study and almost 60% of the memory-safety bugs detected by the OS S-Fuzz service provided by Google LLC of Mountain View, Calif.

Figure 3:
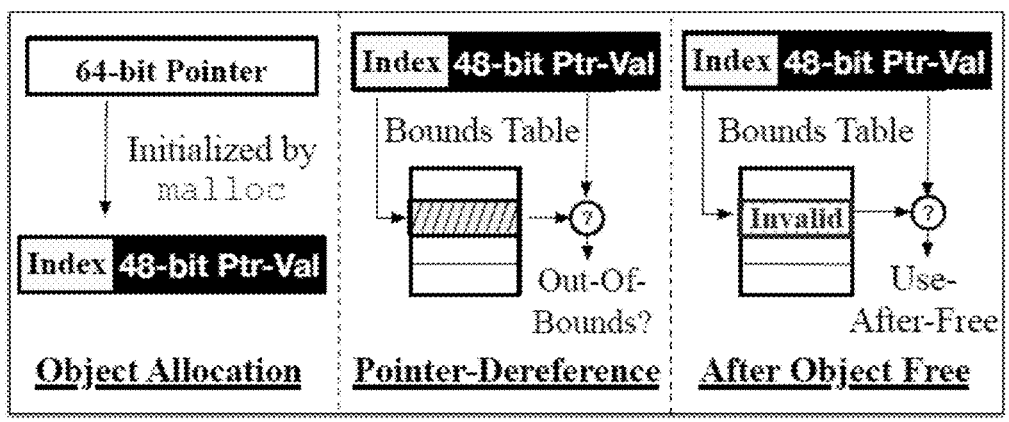
FIG. 3 illustrates an example, non-limiting high-level conceptual overview of re-using unused bits of an object-pointer to enforce spatial and temporal safety for heap-objects, in accordance with one or more embodiments described herein.

FIG. 3 illustrates an example, non-limiting high-level conceptual overview of re-using unused bits (e.g., top bits) of an object-pointer to enforce spatial and temporal safety for heap-objects, in accordance with one or more embodiments described herein. As illustrated by FIG. 3, the disclosed techniques generally re-purpose unused bits (e.g., top-bits) of an object-pointer to store an index of an entry in a bounds-information table (BITable) containing bounds-metadata corresponding to the object-pointer. In an embodiment, the BITable is a per-process BITable. In one or more embodiments, the disclosed techniques intercept C-library memory allocation functions to allocate an entry in a BITable on a malloc and invalidate the entry on a free. As further illustrated by FIG. 3, the BITable can facilitate checking or tracking the bounds-metadata for each object on the heap. Such metadata can be used to enforce bounds-checks on pointer-dereference via bounds-checking operations in load/store execution in hardware. Using an index of a bounds-table entry in the unused bits (e.g., top-bits) of an object-pointer, the disclosed techniques detect out-of-bounds accesses during an object's lifetime. FIG. 3 also illustrates that after an object is freed the disclosed techniques detect use-after-free errors using the index in a dangling-pointer that points to an invalid bounds-table entry.

Of note, the disclosed techniques can facilitate leaving the binary layout unchanged, unlike in prior fat-pointer based approaches. Additionally, the disclosed techniques do not incur any overheads for propagation of the index (which can happen "automatically" via program semantics) when one pointer is assigned to another or passed in a function call, or used to compute another address in array indexing or pointer arithmetic. In contrast, existing solutions can require extra instructions or micro-ops to propagate pointer-metadata. In an embodiment, propagation of the index happens "automatically" without any "extra" instructions being fetched or executed.

Moreover, the performance impact of the actual bounds-checking can be minimal for, at least, two reasons. First, since all the addresses associated with a given buffer can have the same index, the index bits and the bounds information for an address will often be available in an on-chip Bounds Information (BI) cache. Simulations of example implementations show a greater than 98% hit rate for bounds information using an 8 KB on-chip BI cache. Second, the bounds-checking for a load or store operation can be done in parallel with the address translation of the load or store operation—often without adding any extra delay to the load or store instruction. Lastly, as the location of the bounds-information (which can be determined by the index) is independent of the pointer-value, the disclosed techniques can also maintain invalid-bounds status for dangling pointers even after the freed memory is reused. The disclosed techniques can also provide temporal safety at no extra cost, unlike existing hardware-based bounds-checking solutions where the bounds-metadata location is generally linked to pointer-value.

In an embodiment, the disclosed bounds-checking framework for heap-objects can involve a threat model comprising one or more assumptions. One example assumption can be that a program may have heap memory-safety bugs like out-of-bounds access, use-after-free, double-free, and invalid-free. Another example assumption is that an adversary can pass unverified inputs to the program in an attempt to exploit such memory bugs. Another example assumption is that an adversary cannot modify the user-program code to introduce bugs, or directly access or tamper bounds-metadata. Another example assumption is that the memory-allocator functions that can be used by the disclosed framework to manage the bounds-metadata are trustworthy and bug-free.

One aspect of the disclosed bounds-checking framework is to store the bounds-metadata of an object throughout its lifetime in a BITable within a virtual address space of a program. In an embodiment, the BITable is a per-process BITable. Another aspect of the disclosed bounds-checking framework is to enforce hardware-based bounds-checks on all object accesses at runtime.

Figure 4:
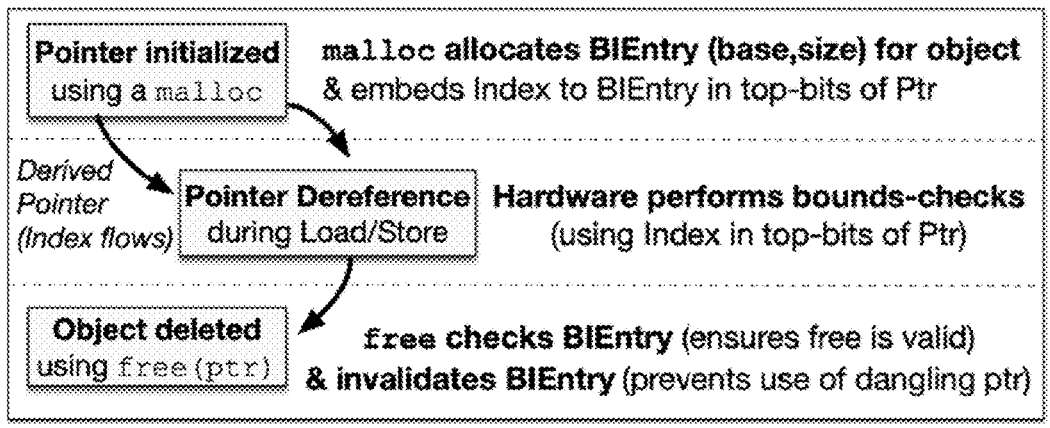
FIG. 4 illustrates an example, non-limiting high-level conceptual overview of a life-cycle of a pointer during program runtime, in accordance with one or more embodiments described herein.

FIG. 4 illustrates an example, non-limiting high-level conceptual overview of a life-cycle of a pointer during program runtime, in accordance with one or more embodiments described herein. As illustrated in FIG. 4, an entry can be created (BIEntry) in the BI Table when an object is created. The BIEntry can be used to store a base-address and a size of the object. In another embodiment, a BIEntry can be used to store the addresses that correspond to the upper and lower bounds of the object. An index of the corresponding entry of the BITable can be embedded within unused bits of the pointer. As used herein, the term "index bits" refers to unused bits of a pointer in which an index of a corresponding entry of a BITable are embedded. For simplicity of implementation, the following disclosure describes the top 24-bits of the pointer being usable as index bits. However, embodiments of the present disclosure are not limited to the index bits being either contiguous or the top 24-bits of the pointer. In an embodiment, the index bits are non-contiguous. In an embodiment, one or more bits of a pointer precede the index bits in the pointer. FIG. 4 further illustrates that hardware can use the index within the top-bits to access the corresponding BIEntry and perform a bounds-check to detect out-of-bounds accesses when the pointer is dereferenced. Moreover, as illustrated in FIG. 4, the corresponding BIEntry can be invalidated when an object is freed. Invalidating corresponding BIEntries can facilitate detection of temporal errors if dangling pointers to such freed objects are used subsequently.

Figure 5:
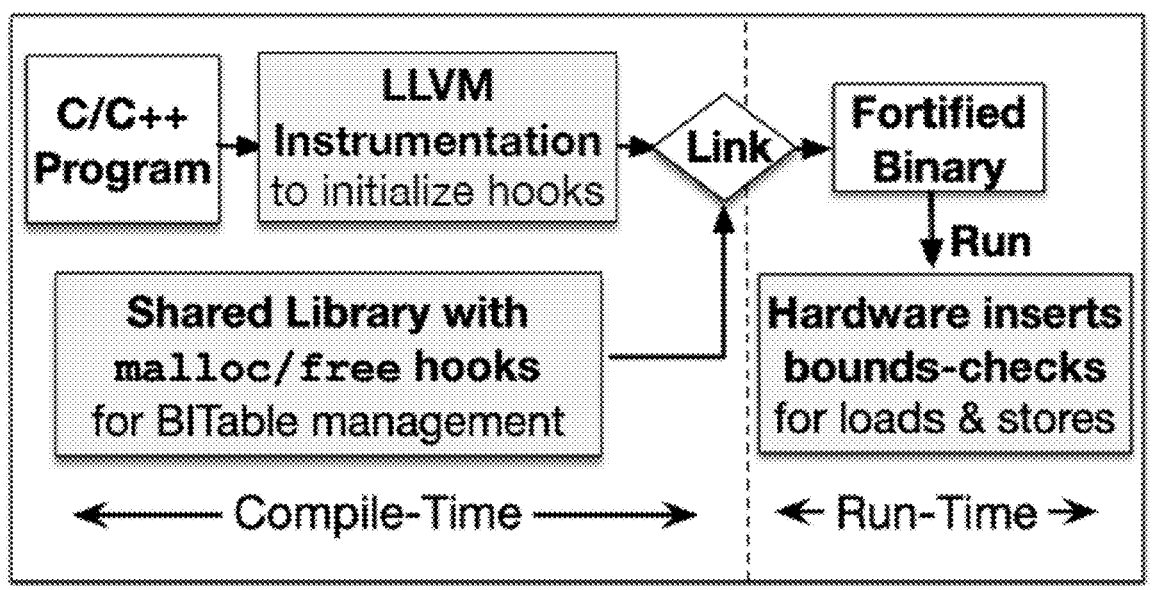
FIG. 5 illustrates an example, non-limiting organizational layout of a bounds-checking framework, in accordance with one or more embodiments described herein.

FIG. 5 illustrates an example, non-limiting organizational layout 500 of a bounds-checking framework, in accordance with one or more embodiments described herein. As illustrated in FIG. 5, software elements can manage the BITable. For example, hooks for malloc and free functions can be used to intercept calls to these functions and to perform associated BITable operations, such as allocation and invalidation of BIEntries. Such hooks can be defined in a shared-library that can be added by the linker during program compilation. Moreover, such hooks can be added during program compilation without requiring any changes to the source-code and without any compatibility issues due to changes to the binary layout. FIG. 5 further illustrates that hardware elements, on which this binary runs, can transparently execute the bounds-checks for every load instruction and/or store instruction to detect memory safety violations. Load instruction and/or store instruction execution can be modified in hardware to also access the BITable and obtain the bounds-metadata for a bounds-check. A bounds-information cache (BICache) can be added to limit any slowdown from accesses to the BITable in memory.

Figure 6:
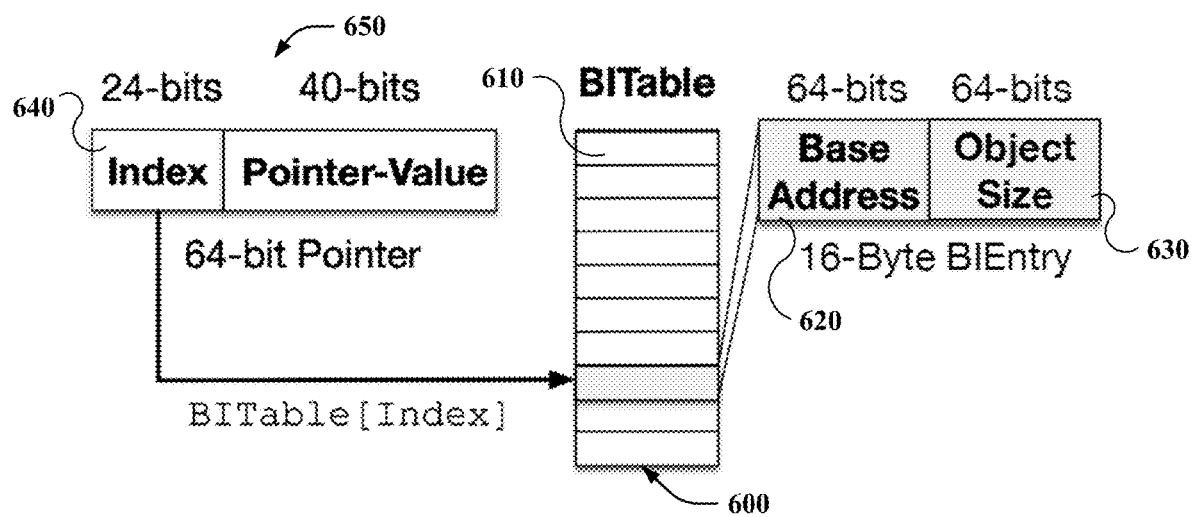
FIG. 6 illustrates an example, non-limiting BITable, in accordance with one or more embodiments described herein.

FIG. 6 illustrates an example, non-limiting BITable 600, in accordance with one or more embodiments described herein. As discussed above, BITable 600 can be maintained within a virtual address space of a program. BITable 600 can store bounds-metadata for each heap-object in the program. Moreover, BITable 600 can be accessed on each load instruction and/or store instruction to a heap-object to execute a bounds-check.

FIG. 6 shows that BITable 600 can be organized as a linear table comprising a plurality of BIEntries (e.g., BIEntry 610) with each BIEntry comprising a base-address field 620 and an object-size field 630. In FIG. 6, each BIEntry of BITable 600 is implemented as a 16-byte BIEntry that contains a 64-bit base-address field and a 64-bit object-size field. In an embodiment, each BI Entry of BI Table 600 can be implemented as a 12-byte BI Entry that contains a 48-bit base-address field and a 48-bit object-size field. Each BIEntry of BITable 600 can be associated with a heap object. Accessing a particular BIEntry of BITable 600 corresponding to a given object can involve a single table-lookup (BITable[index]). The single table-lookup can involve using an index 640 that can be embedded into a pointer 650 during object allocation. In contrast, accessing bounds-metadata using some implementations of the disjoint bounds group 130 of bounds-checking based techniques discussed above with respect to FIG. 1 can involve multi-level table lookups using the pointer-value itself.

Memory space for a BITable can be reserved using an mmap call at program initialization with the MAP_ANONYMOUS flag to facilitate physical pages being allocated lazily on access. Hence, the memory consumed by the BITable can grow proportional to the number of malloced-objects in the program. A virtual address of the base of the BITable and its size can be stored in special hardware registers (BTBASE and BTSIZE, respectively). In an embodiment, the special hardware registers are only accessible from privileged software or internally from the hardware. The virtual address of the base of the BITable and its size can be saved and/or restored with other process-state on context-switches similar to the CR3 register that stores the page-table base in the x86 architecture. This facilitates the hardware calculating a virtual address of a BIEntry as BTBASE+index*16, while executing a bounds-check. The size of the BITable can determine when the entries invalidated on a free need to be reused. In general, the BITable should be large enough to accommodate the maximum number of live objects in the program (objects that are malloced but not yet freed). While the BITable size can be set to 16 million entries (among the SPEC-CPU2017 workloads analyzed below, the maximum live object count was 2.4 million), a user can choose a lower value at compile-time to reduce memory consumption.

LLVM-based instrumentation can be used to initialize malloc/free hooks, before main is executed. In an embodiment, LLVM-based instrumentation can insert a function to initialize the malloc/free hooks. These hooks can intercept subsequent calls from the program to malloc and free from the program. Those subsequent calls involve calling the internal memory allocation functions and creating or deleting a BIEntry. Special instructions (setBIEntry/getBIEntry) can be used to update or check the BIEntry within the trusted hook functions. To facilitate prevention of unauthorized reads or writes to the BITable, other unprivileged software (outside of the trusted memory allocator functions) can be disallowed from accessing the BITable using these special instructions (this can be enforced with binary inspection by a trusted compiler or runtime). In an embodiment, createBIEntry and deleteBIEntry functionality can be implemented as new ISA instructions to facilitate BITable security, with unprivileged usage only allowed in our malloc/free functions (this can be ensured with binary inspection). The hardware can explicitly prevent loads/stores to the BITable from unprivileged software.

Listings 1 and 2 show example function hooks that can be called on malloc/free. When a malloc is intercepted, the real_malloc can be called. The returned base-address and the requested object-size can also be stored in a BIEntry when the malloc is intercepted using the setBIEntry instruction. For the first 16 million mallocs, a new BIEntry can be used in the BITable. Otherwise, one of the BIEntries invalidated on a free can be reused in FIFO order using a FIFO that can store the index values of freed BIEntries. The index of this BIEntry can then be embedded in the top-24 bits of the pointer and returned to the program. When a free is intercepted, the index in the top-24 bits of the pointer can be used to get the BIEntry using the getBIEntry instruction. The index in the top-24 bits of the pointer can also be used to verify that the pointer-value matches the object base address. Then, the BIEntry can be invalidated (e.g., the corresponding object base address and object size can be set to 0) and the real_free can be called to free the object.

Listing 1: malloc_hook

```
.. //get a free BIEntry
//index: the new entry
p = real_malloc( size );
___setBIEntry(index .p. size );
return(p | ( index << 40 );
}
```

Listing 2: free_hook

```
//p: ptr passed to free
index = p >> 40;
p = p & 0xFFFFFFFFFF;
___getBIEntry( index , p );
.. //check p matches BIEntry
___setBIEntry( index , 0, 0);
.. //add index to free list
real_free(p);
```

Figure 7:
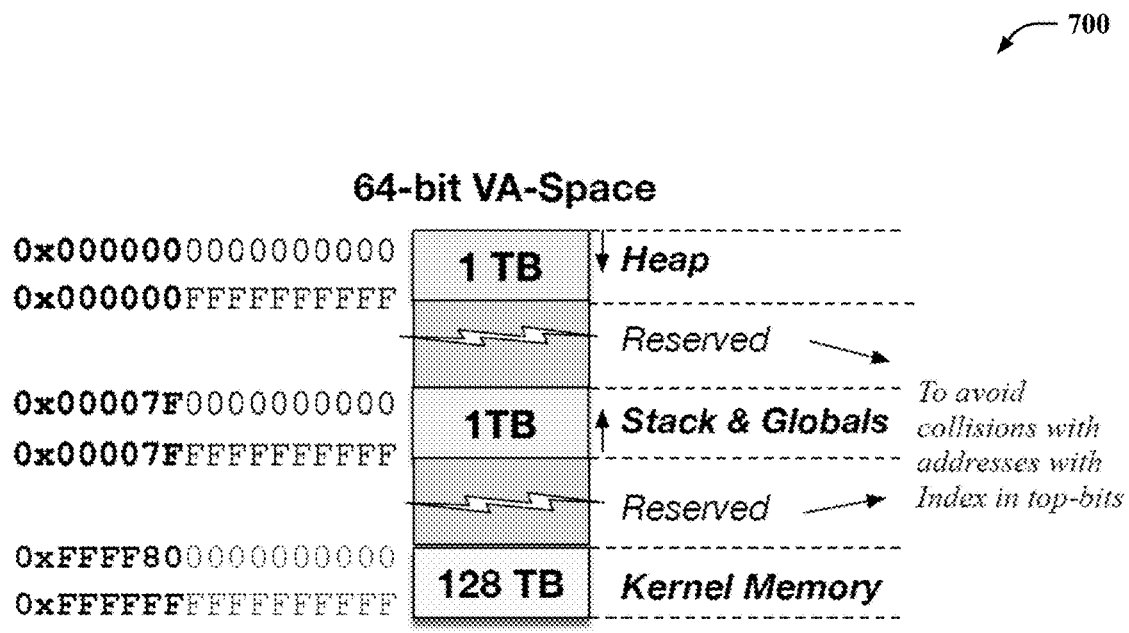
FIG. 7 illustrates an example, non-limiting layout for a 64-bit Virtual-Address space of a program, in accordance with one or more embodiments described herein.

FIG. 7 illustrates an example, non-limiting layout 700 for a 64-bit Virtual-Address space of a program, in accordance with one or more embodiments described herein. As discussed above, one or more embodiments of the disclosed bounds-checking framework can replace the top 24-bits of a heap-object pointer with an index of a corresponding BIEntry in a BITable. On 64-bit Linux systems with a 4-level page-table, programs can typically use a 48-bit user Virtual-Address space. Since the index bits can overlap with the top 8-bits of a 48-bit user-address, the program Virtual-Address space can be constrained to a 2 terabyte (TB) region to avoid collisions of program addresses with heap-addresses containing the 24-bit index bits, as shown in FIG. 7. Examples of how embodiments of the disclosed bounds-checking framework can handle uncommon scenarios will be discussed below in greater detail. Such uncommon scenarios can include: instances where a program needs Virtual-Address space larger than 2 TB; instances where sufficient index-bits are unavailable in the pointer; or instances where the BITable size is insufficient.

In layout 700, the heap grows upwards from 0x0 to 0xFFFFFFFFFF and the stack grows downwards from 0x7FFFFFFFFFFF to 0x7F0000000000. The remaining 254 TB user Virtual-Address space (i.e., the remaining part of the 48-bit Virtual-Address space) can be reserved with an mmap call using the PROT_NONE memory-protection argument. Usage of index value 0x7F in layout 700 can be skipped for heap-objects to avoid collision with stack-addresses. Also, usage of index values from 0xFFFF80-0xFFFFFF in layout 700 can be skipped to avoid collision with kernel addresses. The index 0x0 can be reserved for the NULL pointer (e.g., pointer-value "0") to support free called on NULL pointer, which can be valid program behavior.

The detection of out-of-bounds accesses and use-after-free in the disclosed bounds-checking framework can depend on the bounds-checks, inserted by the hardware on loads and stores. The following disclosure provides an example design and implementation of such hardware-based bounds-checks. In this example of the disclosed bounds-checking framework, all loads and stores to heap-objects (which can be identified by the presence of an index in the top 24-bits) can have a hardware-based bounds-check included as a part of the load/store execution. That bounds-check can involve using the index to lookup the corresponding BITable entry and obtaining the base address and size of the object. Based on the obtained base address and size of the object, the hardware-based bounds-check can assert that the access is within [base address, base address+object size]; else, an out-of-bounds exception can be triggered. If the BIEntry base address and object size are 0, a use-after-free exception can be raised. If the BIEntry has been re-used, a dangling pointer access can still be detected due to mismatch in bounds with a high probability, but flagged as an out-of-bounds exception.

Figure 8:
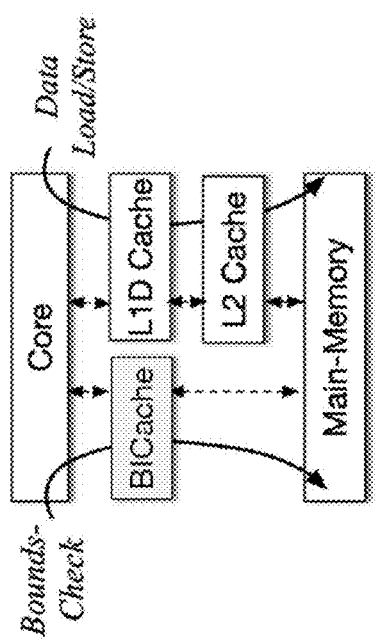
FIG. 8 illustrates an example, non-limiting hardware organization for implementing a hardware-based bounds-check, in accordance with one or more embodiments described herein.

FIG. 8 illustrates an example, non-limiting hardware organization 800 for implementing a hardware-based bounds-check, in accordance with one or more embodiments described herein. For the hardware-based bounds-check, the address of the BIEntry for the bounds-check can be calculated using the BITableBase register and index-bits from the load/store address as BTBASE+Index*16, and the address-translation can be identical to a regular load. The execution of the bounds-check can begin when the virtual address of a load/store is ready, and can continue in parallel to the load/store execution without impacting its execution. The hardware-based bounds-check is only on the critical path of a load/store commit-stage, which commits a load/store only if the check passes; else, it stalls until the bounds-check completes. FIG. 8 shows that BITable entries can be cached within hardware organization 800 in a dedicated cache (BICache), which can be similar to L1-Dcache. BICache can be accessed for hardware-based bounds-checks in parallel to L1Dcache on loads/stores, which can minimize the performance impact of the hardware-based bounds-checks. Hardware-based bounds-checks that hit in the BICache can have minimal to no impact on load/store latency.

Figure 9:
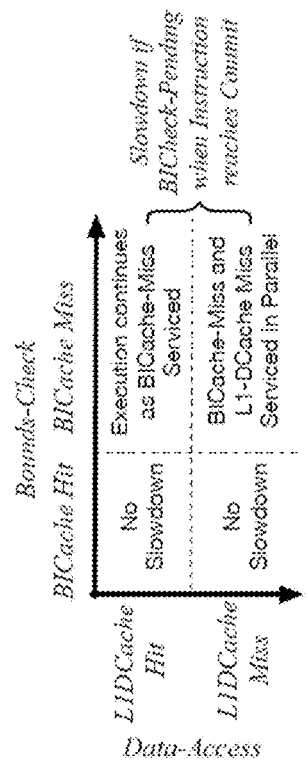
FIG. 9 illustrates example, non-limiting scenarios for slowdown involving hardware-based bounds-checks, in accordance with one or more embodiments described herein.

FIG. 9 illustrates example, non-limiting scenarios for slowdown involving hardware-based bounds-checks, in accordance with one or more embodiments described herein. FIG. 9 shows that slowdown can generally be incurred only if bounds-check has a BiCache-Miss and the bounds-check is still pending by the time a corresponding load/store instruction reaches a commit-stage.

In an embodiment, the disclosed bounds-checking framework can use a dedicated 8 kilobyte (KB), 8-way BICache for BITable entries. All accesses to the BITable (for bounds-checks and also loads and stores to the BITable from malloc and free) can be routed through the BICache. The design of the BICache can be Virtually-Indexed Physically Tagged (VIPT) and can be substantially similar to the L1-Dcache with a substantially similar latency (but much smaller in size). That design can facilitate ensuring that load/store execution perceives no performance impact if the hardware-based bounds-check gets a hit in the BICache. On a miss, for simplicity, the BIEntry can be serviced from the memory. In an embodiment, entries can also be cached in a last-level cache to facilitate further reducing overheads. The load/store queue entries can be extended to store the status of pending bounds-checks in case a BICache miss delays the bounds-check. Storing the status of pending bounds-checks can involve storing a 48-bit BIEntry address, a 1-bit checkIssued flag, and a 1-bit checkComplete flag.

In an embodiment, the disclosed bounds-checking framework can utilize ISA support for some instructions to prevent unauthorized accesses to the BITable by an unprivileged adversary. Such instructions can include the initBITable instruction. The operating system (OS) can use the initBITable instruction to set the BITable base address in the BTBASE register in hardware to an arbitrary virtual address at program-initialization and the size in the BTSIZE register. Any access to the BTBASE register and/or the BTSIZE register from unprivileged software can cause an exception.

Such instructions can also include the setBIEntry instruction and the getBIEntry instruction that can allow the trusted malloc/free functions to write or read the BIEntry. For example, the setBIEntry instruction can set a particular BIEntry (BITable[index]={base, size}) and can be used for assigning or invalidating a BIEntry in malloc or free. The getBIEntry instruction can allow the free to read the BIEntry and check if a pointer to be freed is valid (BIT able[index].base==ptr_val). A trusted compiler or runtime can facilitate ensuring that the setBIEntry instruction and/or the getBIEntry instruction are only used in trusted memory allocator functions. Moreover, hardware can facilitate preventing explicit loads and stores from unprivileged software to the addresses where the BITable is mapped. This can ensure that an unprivileged adversary cannot read or write to the BITable, even if that adversary guesses the BITable address.

In an embodiment, the malloc and free hook functions can be implemented in a thread-safe manner by using locks to ensure atomic updates to the BITable and the BITable management data-structures (e.g. free-entry FIFO). Additionally, the coherence between the BICaches (having a VIPT design) across different cores can be maintained using the existing cache-coherence fabric in hardware. The updates to the BITable from one core can be reflected in accesses from other cores, without any extra software intervention. As long as the program itself is written in a thread-safe manner (e.g., no data-race between a free and an access to the same object from different threads), and the internal memory allocator itself is thread-safe, the disclosed bounds-checking framework can retain compatibility with multi-threaded programs.

As discussed above, some uncommon scenarios can arise when implementing embodiments of the disclosed bounds-checking framework. In exceptional cases, the BITable may be unable to store all the BIEntries for a program. For example, the BITable may be unable to store all the BIEntries for a program if the program has more active objects than the BITable size. As another example, the BITable may be unable to store all the BIEntries for a program if a sufficient number of index bits are unavailable in the pointer.

In such cases, an overflow-table can be used to store the bounds-metadata. Pointers whose metadata is maintained in the overflow-table can be identified, by embedding a special value in their index-bits. For such pointers, the overflow-table can be looked-up using the pointer-value itself. As such lookups can involve expensive multi-level table lookup, programs can ensure only infrequently used BIEntries are placed in such an overflow table. For the SPEC-CPU2017 workloads evaluated with implementations of the disclosed bounds-checking framework, a 16 million entry capacity BITable was more than sufficient (<3 million entries were used at the maximum) and an overflow table was not required.

The following disclosure provides example types of memory safety bugs that one or more embodiments of the disclosed bounds-checking framework can detect. The following disclosure further discusses examples of how an adversary can be prevented from accessing bounds-checking metadata. New potential bugs that can be detected using one or more embodiments of the disclosed bounds-checking framework are also discussed.

An example implementation of the disclosed bounds-checking framework was tested with 25 exploits from the How2Heap exploit suite that leverage heap spatial and temporal safety bugs like out-of-bounds accesses, use-after-free, invalid-free, and double-free. The example implementation of the disclosed bounds-checking framework was able to detect the bugs in all 25 of these programs and raise an exception to terminate the program before the objective of the exploit is achieved. Out of these, the example implementation of the disclosed bounds-checking framework detected an Out-Of-Bounds access in 8 exploits, Use-After-Free in 10 exploits, and Invalid/Double-Free in 7 exploits.

With respect to the Out-Of-Bounds accesses, a bounds-check, inserted in parallel to the load/store, can check the BIEntry and can ensure that the access is within object bounds on loads and stores. With respect to Use-After-Free, if a bounds-check on a load/store finds the BIEntry to have base=0 and size=0, the object was either recently freed or the BIEntry was uninitialized (object was never malloced). In that instance, the example implementation of the disclosed bounds-checking framework can flag both scenarios as errors and identify these bugs in 10 out of 25 exploits. If the BIEntry is re-allocated between a Free and a Use-After-Free, the Use-After-Free can be detected as an out-of-bounds access with high probability. Alternatively, an overflow table can also be used to avoid any re-use of BIEntries altogether. With respect to Double-Free and Invalid-Free, if a mismatch is detected by the BIEntry check on a free, that verifies the pointer-to-be-freed matches the object-base in the corresponding BIEntry, it can be indicative of an invalid or a double-free bug. If the index in the top-bits of the pointer is not a valid value, or if the BIEntry object-base does not match, then an invalid-free bug can be flagged. Else if the BIEntry base and size are 0, then a double-free bug can be flagged.

The two types of metadata used by one or more embodiments of the disclosed bounds-checking framework for checking the bounds for a load or store are: (i) the BIEntry in the BITable containing the bounds; and (ii) the index bits in the pointer used to access it. The following disclosure discusses examples of how both types of metadata can be protected in accordance with one or more embodiments described herein.

With respect to protecting the BITable, an unprivileged adversary cannot read or modify the BITable directly. Unprivileged software can be prevented from executing loads or stores to the virtual-memory where the BITable is mapped, by the hardware. This check can be enforced by the load/store unit by preventing any unprivileged loads or stores to the range of addresses starting from BTBase to BTBase+BITableSize. The setBIEntry and getBIEntry instructions that allow unprivileged software to access the BITable are generally only permissible within the trusted memory allocator functions (this can be enforced by a trusted compiler or runtime). In general, only a privileged OS or system software, or the hardware can directly access the BITable.

With respect to protecting index bits of a pointer, it can be assumed that an adversary cannot change the victim code to arbitrarily overwrite a pointer or generate wild pointers. However, an adversary can try to leverage any unsafe pointer-arithmetic in the victim code, and use unvalidated inputs to cause an overflow or underflow that corrupts the index-bits. Such a corruption will often be detected as an error during a bounds-check implemented in accordance with one or more embodiments described herein. Corruption of the index-bits can also be prevented by extending the central processing unit (CPU) registers to separately store index-bits for pointers to explicitly isolate the index-bits from pointer-arithmetic.

The following disclosure presents results of an example test performed on example bounds-checks implemented by an embodiment of the disclosed bounds-checking framework that were modeled with Gem5. The example test was performed using 13 C/C++ SPEC-CPU2017 binaries compiled using clang-11 and Glibc-v2.27. The following disclosure discusses the out-of-bounds accesses detected by the example bounds-checks when the pointer-accesses were checked against the allocation-bounds of an object, where the BIEntry stores the 16-Byte aligned size allocated by malloc One or more embodiments of the disclosed bounds-checking framework also support byte-granularity bounds-checks by storing object-size requested by the program in BIEntry.

Figure 10:
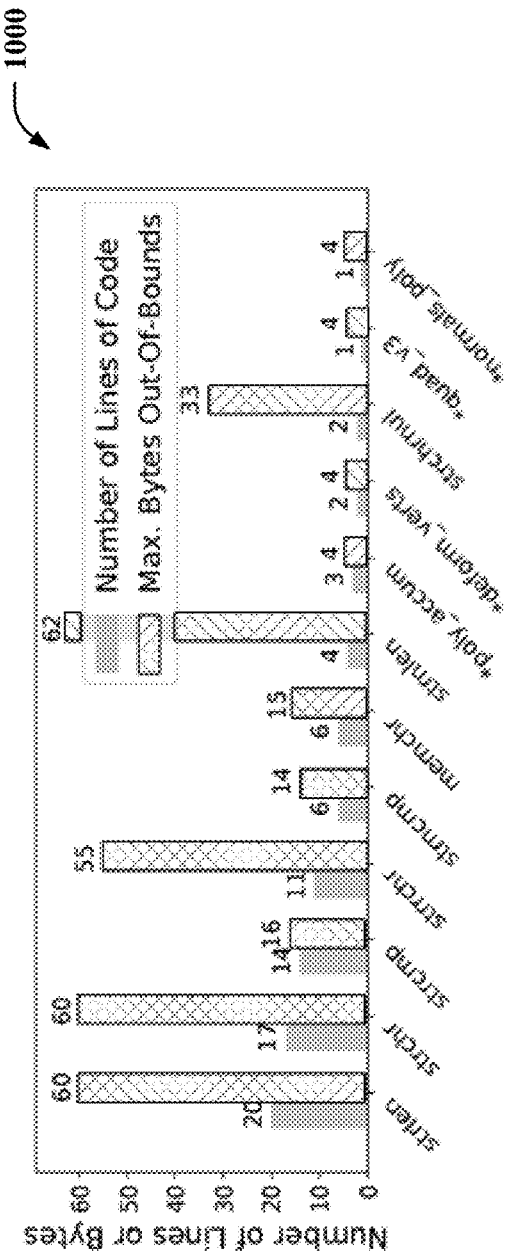
FIG. 10 illustrates an example, non-limiting chart depicting functions where out-of-bounds accesses were detected with a hardware-based bounds-checking framework, in accordance with one or more embodiments described herein.

FIG. 10 depicts the results of the example test. In particular, FIG. 10 illustrates an example, non-limiting chart 1000 depicting functions where out-of-bounds accesses were detected with the embodiment of the disclosed bounds-checking framework. Chart 1000 shows functions where out-of-bounds accesses were detected with an example implementation of the bounds-checking framework across 13 SPEC C/C++ binaries run for 11 billion instructions on the Gem5 simulator. Overall, the example bounds-checking framework detected out-of-bounds accesses in 87 lines of code, as shown by FIG. 10. Among those 87 lines of code, 80 lines of code were in highly optimized Glibc-v2.27 functions used for string handling (including strlen, strchr, strcmp, etc.) and 7 lines of code in four user-functions of blender program. In this example test, the maximum number of bytes by which these accesses go out-of-bounds is 62 bytes for the Glibc functions and only 4 bytes for the functions in blender.

Figure 11:
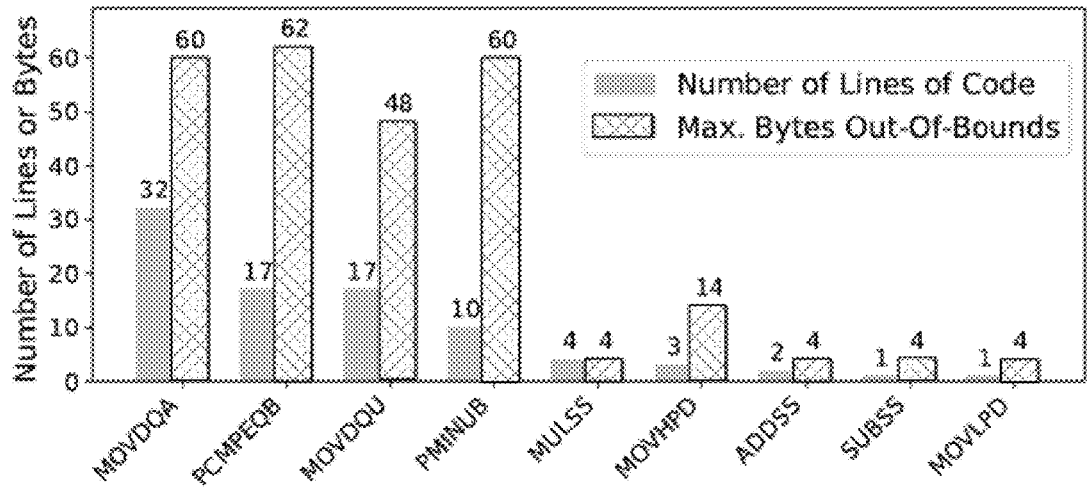
FIG. 11 illustrates an example, non-limiting chart depicting instructions in SPEC-CPU2017 applications that caused out-of-bounds, in accordance with one or more embodiments described herein.

All of these bugs detected in the example test were observed to be due to SIMD instructions that load data from the memory to a SIMD register. FIG. 11 illustrates an example, non-limiting chart 1100 depicting instructions in SPEC-CPU2017 applications that caused out-of-bounds, in accordance with one or more embodiments described herein. As shown by FIG. 11, such instructions in the Glibc string handling functions include SIMD move (MOVDQA, MOVDQU, MOVHPD, MOVLPD) or compare (PCMPEQB) or minimum (PMINUP) instructions. FIG. 11 also shows that such instructions in blender included SIMD arithmetic instructions (MUSS, ADSS, SUBSS). On inspection, the bugs in blender occurred when the compiler used unaligned 16-byte SIMD loads to access memory at the boundary of an object resulting in partially out-of-bounds accesses, when compiled with the O3 flag; these disappeared on using the O0 flag as SIMD arithmetic was not used. The bugs in Glibc functions appear to be more serious as they were in the shared-library (libc.a) distributed with Ubuntu 18.04, and as they access memory that is out-of-bounds by up to 62 bytes.

Inspection of strlen, the function having the most lines of code (20) with out-of-bounds accesses determined that a majority of its bugs (11 out of 20) are due to the instruction PCMPEQB used to perform a byte-wise comparison of 16B operands (one from memory, and other from a register). The strlen function uses these to perform fast checks for the '\0' (null) character in an input string, to compute the string length. Listing 3 shows example assembly-code for strlen generated from the object-dump of libc.a in Glibc-v2.27. The code issues three (in other locations, up to four) 16-byte comparisons together before using a test and a jump instruction to stop the comparison if a null is encountered. This unsafe code can access memory up to 47-bytes (up to 63-bytes with four 16-byte comparisons) outside of a string object. These binaries were also tested with a default version of ASAN which was unable to detect any of these bugs, as ASAN requires recompilation of shared-libraries to be able to detect any bugs in them. Moreover, the default implementation of ASAN does not detect partially out-of-bounds accesses with unaligned loads that the embodiment of the disclosed bounds-checking framework detected in blender.

Listing 3: Disassembly of strlen_sse2 from libc.a

```
0x3e: pcmpeqb 0x10(%rax ),%xmm1 //16-byte compare
0x43: pcmpeqb 0x20(%-rax ),%xmm2 //16-byte compare
0x48: pcmpeqb 0x30(%rax ),%xmm3 //16-byte compare
0x4d: pmovmskb %xmm1,%edx //16-bit result in edx
0x51: pmovmskb %xmm2,%r8d //16-bit result in rd8
0x56: pmovmskb %xmm3,%ecx //16-bit result in ecx
...
// code-block assembles 48-bit result in rdx
..
0x79: test       %rdx,%rdx //checks if '\0' found
0x7c: je         100 <__strlen_sse2+0x100> //jump
```

The following disclosure outlines the evaluation methodology utilized to implement the example test discussed above. The following disclosure further discusses overheads of example software and hardware modifications that can be involved in implementing one or more embodiments of the disclosed bounds-checking framework.

The evaluation methodology involved packaging the software changes for the embodiment of the disclosed bounds-checking framework (including the malloc/free hooks) as a shared-library. That methodology further involved utilizing instrumentation added with LLVM10 to add an initialization function before the program main. The hardware changes for the embodiment of the disclosed bounds-checking framework were modelled in Gem5 v20.0. For performance evaluations, the evaluation methodology involved utilizing 13 out of 16 C/C++ benchmarks available in SPEC-CPU2017 with the ref dataset (3 workloads did not run with the evaluation methodology). The evaluation methodology also involved evaluating the overheads of the software instrumentation by running the instrumented binaries to completion (emulating the ISA changes in C-code) on a native machine (Xeon CPU E-2174G at 3.80 GHz provided by the Intel Corp. of Santa Clara, Calif.), and comparing them against uninstrumented binaries. For hardware overheads, the evaluation methodology involved using the instrumented binary and running it with and without the bounds-checks on Gem5 in System-Call Emulation mode. The evaluation methodology further involved fast-forwarding the first 10 billion instructions to skip the initialization phase and warmup the caches, and tracking statistics for 1 billion instructions. The hardware configuration that the evaluation methodology used for Gem5 is shown in Table 1.

TABLE 1

| Processor | |
| --- | --- |
| Core | Single-core, Out-of-Order Execution, 3.5 GHz ROB - 192 entries. LQ - 32 entries, SQ - 32 entries |
| Cache-Hierarchy | |
| Li-DCache, | 32 KB/core, 8-way, 64 B line-size, 2-cycle latency. |
| L1-ICache | 8 KB/core, 8-way, 64 B line-size, 2-cycle latency |
| BICache | 2 MB/core, 16-way, 64 B line-size, 20-cycle |
| L2-Cache | latency. |
| DRAM Memory-System | |
| Bus frequency | 1200 MHz (DDR 2.4 GHz). 14-14-14 ns |
| DRAM Timings | tCAS = 14 ns, tRCD = 14 ns, tRP = 14 ns |
| DRAM Organization | 1-channel, 1 KB Row-Buffer |

Figure 12:
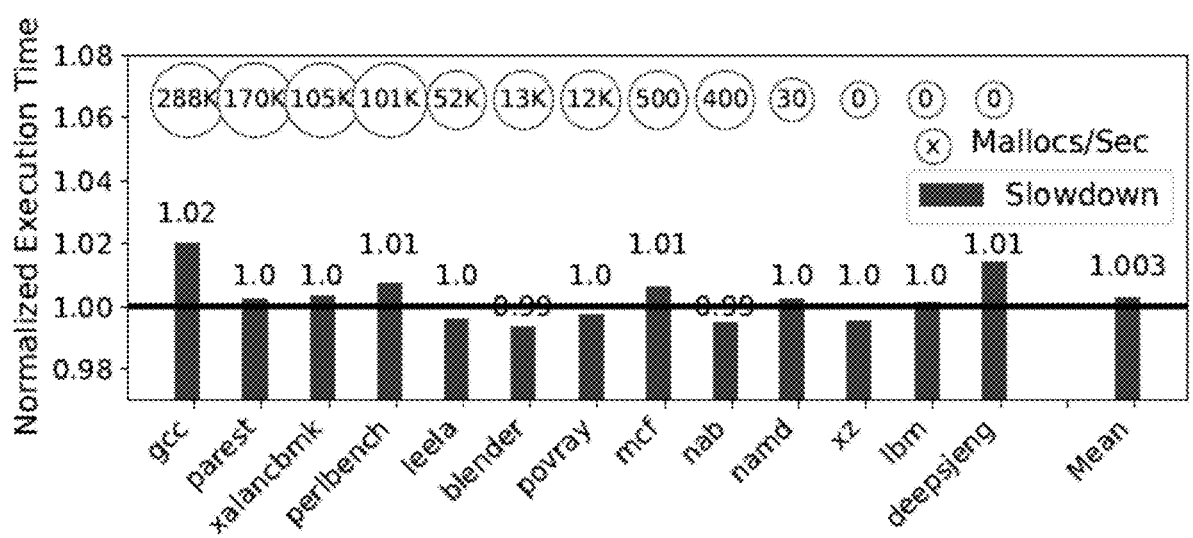
FIG. 12 illustrates an example, non-limiting chart depicting performance impact of software instrumentation for BITable management, in accordance with one or more embodiments described herein.

FIG. 12 illustrates an example, non-limiting chart 1200 depicting performance impact of software instrumentation for BITable management, in accordance with one or more embodiments described herein. In particular, chart 1200 depicts execution times of applications linked with a shared-library intercepting malloc/free calls to update a BITable. Chart 1200 generally facilitates evaluating slowdown that can be associated with malloc/free instrumentation. The execution times depicted in chart 1200 have been normalized to the execution time of uninstrumented binaries. Each execution time depicted in chart 1200 was obtained by running a corresponding program to completion on a native system and measuring an overall execution time. To facilitate native execution while also modelling the BITable management overheads, BIEntries were allocated on mallocs without embedding the index bits in the pointer and on frees a random BIEntry were deleted. FIG. 12 shows that on average, the software instrumentation for BITable management (without bounds-checks) can add approximately 0.5% slowdown across all programs. Workloads with the high malloc-frequency (e.g., gee and perlbench) can have slowdowns of up to 1.8%-2.4% due to increased cache accesses for BITable updates. Other workloads with few mallocs can see negligible performance impact.

Figure 13:
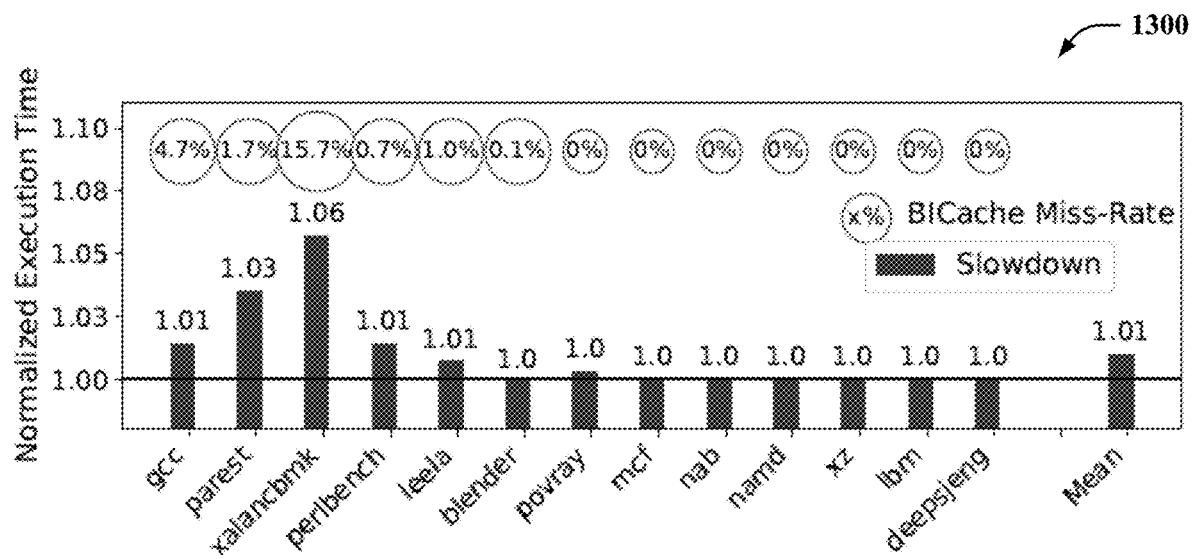
FIG. 13 illustrates an example, non-limiting chart depicting performance impact of hardware bounds-checks, in accordance with one or more embodiments described herein.

FIG. 13 illustrates an example, non-limiting chart 1300 depicting performance impact of hardware bounds-checks, in accordance with one or more embodiments described herein. In particular, chart 1300 depicts execution times for 1-billion instructions of instrumented binaries running with Bounds-Checks that have each been normalized to an execution time of corresponding binary without Bounds-Checks. Chart 1300 generally facilitates evaluating slowdown that can be associated with hardware-based bounds-checks in Gem5 using instrumented binaries. FIG. 13 shows that on average, hardware bounds-checks can add approximately 1% slowdown. The main driver of these overheads can be the memory-accesses incurred by bounds-checks due to misses in the BICache. Workloads with high frequency of mallocs (e.g., xalancbmk, gcc and parest) tend to have smaller buffers and hence fewer buffer accesses sharing the same index. This can result in larger working-sets of bounds-metadata that can cause higher BICache miss-rates (e.g., 2% to 16%) and higher slowdown (e.g., 1% to 6%). Other workloads, with >99% BICache hit-rate, can have negligible slowdown.

Figures 14, 15:
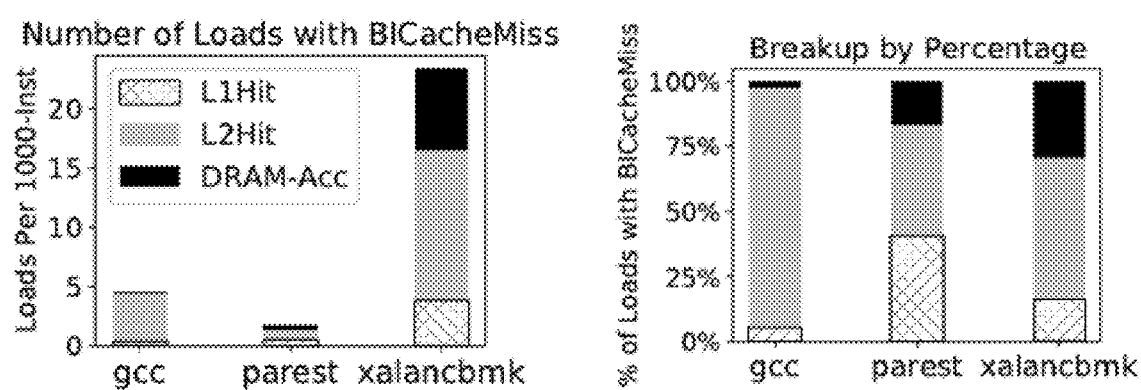
FIG. 14 illustrates an example, non-limiting chart depicting loads per 1000-instructions with a BICache miss, in accordance with one or more embodiments described herein.
FIG. 15 illustrates an example, non-limiting chart depicting percentages of loads with a BICache miss, in accordance with one or more embodiments described herein.

FIGS. 14-15 illustrate an example breakdown of scenarios on loads having a BICache miss. In particular, FIG. 14 illustrates an example, non-limiting chart 1400 depicting loads per 1000-instructions with a BICache miss; and FIG. 15 illustrates an example, non-limiting chart 1500 depicting percentages of loads with a BICache miss, in accordance with one or more embodiments described herein. To understand the slowdown in workloads like xalancbmk, gcc, and parest, the scenarios in which they incur BICache misses were evaluated, as there can be no slowdown if the bounds-check has a BICache-Hit. In general, the evaluation determined that more than 98% of the BICache misses are incurred by bounds-checks on load-operations whereas only 2% of the misses occur on stores.

Charts 1400 and 1500 show the break-down of BICache-Misses for load-operations based on where the load was serviced from (by absolute numbers and by percentage, respectively. As shown by charts 1400 and 1500, the xalancbmk workload has the most BICache-Misses (as it has the highest miss-rate), and consequently the highest slowdown. On the other hand, the gcc workload has a higher miss-rate than the parest workload, but the gcc workload incurs lesser slowdown. In general, the gcc workload incurs lesser slowdown because it has a much lesser fraction of BICache-Misses when the load is an L1-Hit (that impacts performance more than a BICache-Miss on a load that was an L1-Miss). This lack of locality in BICache accesses on L1-Cache Hits can be the main driver for the slowdown for the xalancbmk and parest workloads. However, this can be addressed by making the BIEntry allocation algorithm locality-sensitive, especially for sub-cacheline objects that are common in these benchmarks, to reduce the overheads for these workloads.

FIGS. 16-17 illustrate example slowdowns associated with bounds-checks versus BICache size. In particular, FIG. 16 illustrates an example, non-limiting chart 1600 depicting average slowdowns associated with bounds-checks as BICache size varies; and FIG. 17 illustrates an example, non-limiting chart 1700 depicting BICache miss-rates as BICache size varies, in accordance with one or more embodiments described herein. While the example evaluations of bounds-check overheads discussed above utilized a default BICache size of 8 KB, charts 1600 and 1700 depict evaluations of other BICache sizes. Specifically, charts 1600 and 1700 show the slowdown associated with bounds-checks and BICache miss-rates as the BICache size is varied from 1 KB to 64 KB. Charts 1600 and 1700 illustrate that as BICache size increases, slowdown can decrease from 7% (1 KB) to 3% (4 KB) to 1% (8 KB). With further increase in BICache size, the decrease in slowdown can be marginal. This is because beyond 8 KB, the average BICache miss-rates generally does not decrease much, as the miss-rates for most workloads can be less than 1%.

FIGS. 18-19 illustrate example memory overheads associated with implementing an embodiment of the disclosed bounds-checking framework. In particular, FIG. 18 illustrates an example, non-limiting chart 1800 depicting memory bandwidth overhead associated with bounds-checks; and FIG. 19 illustrates an example, non-limiting chart 1900 depicting memory overhead associated with a BITable, in accordance with one or more embodiments described herein. Chart 1800 shows that on average, the bounds-checks can increase application memory bandwidth consumption by approximately 29%. However, that application memory bandwidth consumption can vary based on BICache design. For example, the bandwidth requirements can be reduced by caching BIEntries additionally in a shared last-level cache. Fortunately, the extra bandwidth requirement can be met by DDR4 DRAM without resulting in slowdown. With regards to memory consumption, a BITable can consume a maximum of 256 MB when configured for 16 million entries with 16-bytes per entry. In this configuration, the BITable can consume 39% extra memory, on average. In an embodiment, a memory optimized BITable design (e.g., BITable-MemOpt) with 8 million entries and 12-Byte entries (storing 48-bit base and bounds) can consume approximately 17% extra memory. These overheads can be much lower than shadow-memory based solutions like the disjoint bounds group 130 of bounds-checking based techniques discussed above with respect to FIG. 1, as the memory needed by the BITable can grow with the number of mallocs and not with program memory usage.

The following disclosure describes other hardware-based solutions for spatial and temporal safety, and contrasts the disclosed hardware-based bounds checking framework against them. One distinguishing aspect of the disclosed bounds-checking framework compared to other bounds-checking solutions is that the disclosed bounds-checking framework facilitates the propagation and lookup of bounds information at very low-cost.

As discussed above with respect to FIG. 1, one technique in the disjoint bounds group 130 bounds-checks by accessing bounds-metadata from shadow-memory, but it only provides spatial safety. Another technique in the disjoint bounds group 130 extends this design to provide temporal safety at moderate cost (e.g., 24% avg. slowdown) by associating pointers with a unique identifier that can be revoked (also stored in the shadow-memory). Such shadow-memory accesses on bounds-checks have limited temporal locality, as different shadow-memory locations are accessed for loads/stores to different words of a single object. In one or more embodiments of the disclosed bounds-checking framework, the BITable can be accessed using the index-bits in the pointer, which facilitates ensuring that all loads/stores to a single object can use the same BITable entry. In turn, this facilitates enabling low-cost bounds-checks (e.g., 1% slowdown) that can have more than 98% hit-rate in the BICache.

Another technique in the disjoint bounds group 130 provides spatial and temporal safety, associated pointers with capabilities stored in a separate capability-table, that is indexed using a Capability-ID to obtain the bounds on bounds-checks. However, deriving the Capability-ID from a pointer-value can be expensive for pointers spilled to memory, that require a second expensive lookup of a 5-level Pointer-Alias Table. Although that technique proposed a speculative pointer-tracking mechanism in hardware for low-cost propagation of Capability-ID to derived pointers, and caching of capabilities and identifiers to limit average slowdown to 15%, the expensive table-lookups can result in high worst-case slowdowns up to 40%. Moreover, transferring the Capability-ID across pointer-arithmetic requires speculative pointer-tracking mechanisms. In contrast, embodiments of the disclosed bounds-checking framework utilize a BITable that can be looked up using an index that is embedded within unused bits of a pointer, and can be automatically transferred to derived pointers at no extra cost, limiting worst-case slowdown to approximately 7%.

Other techniques in the disjoint bounds group 130 can offer spatial safety and temporal safety, but incur high overheads (e.g., 50-60% on average) as their bounds-checks require extra explicit instructions and involve expensive table-lookup as the bounds-table is organized as a two-level trie. In contrast, embodiments of the disclosed bounds-checking framework can implement bounds-checks that require at-most a single table-lookup that can have high temporal locality and can be inserted transparently in hardware during load/store execution.

Techniques in the adjacent bounds group 110 can provide memory safety at the cost of changes to binary layout, that impacts compatibility with existing library-code. Techniques in the inline bounds group 120 can avoid compatibility issues by re-purposing unused pointer bits for bounds-metadata, but at the cost of not being able to provide temporal safety. Embodiments of the disclosed bounds-checking framework can maintain compatibility with legacy shared-libraries and can even provide memory safety (both temporal and spatial) for pointers passed to existing shared libraries, while ensuring negligible slowdown.

Trip-wire based probabilistic techniques can provide low-cost detection of memory errors (e.g., 2%-18% slowdown), by inserting magic-values (i.e., trip-wires) at an object or sub-object granularity and checking for them in hardware, to detect out-of-bounds accesses that activate such trip-wires. However, such techniques cannot detect larger out-of-bounds accesses, that access memory beyond the trip-wire. Embodiments of the disclosed bounds-checking framework can provide precise detection of all out-of-bounds accesses, at equal or better performance.

Memory-Tagging based probabilistic techniques assign a tag or "color" for an object-pointer pair, maintain these tags separately for both, and check if the tags of a pointer and the accessed memory match on a pointer dereference. While such techniques can have negligible slowdown (e.g., <5% slowdown), they are only able to detect errors probabilistically as they use 4-bit tags (stored in the top-bits of the pointer), that are re-used for different objects, leading to false-negatives. Embodiments of the disclosed bounds-checking framework can also re-purpose the pointer-bits, but in contrast, uses them to store the index to the actual bounds-information. As such, embodiments of the disclosed bounds-checking framework can provide precise enforcement of object-bounds (high-coverage) at comparable slowdowns.

Figure 20A:
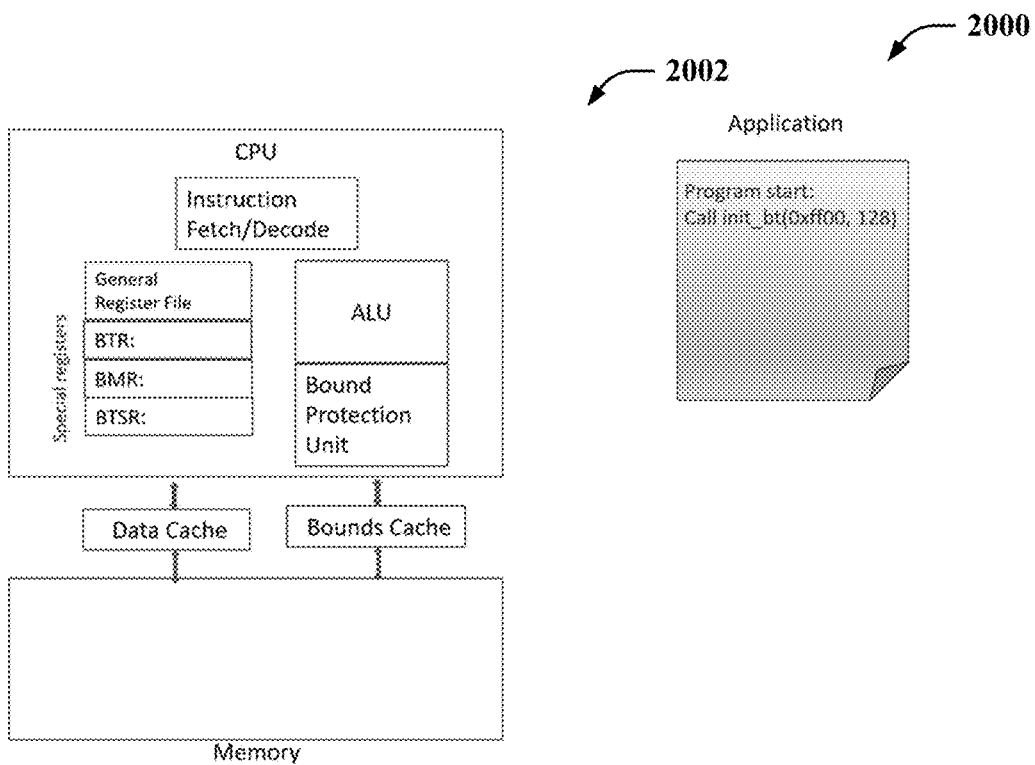
FIGS. 20A-20G illustrate an example, non-limiting operational flow for initializing a BITable in memory, in accordance with one or more embodiments described herein.
Figure 20B:
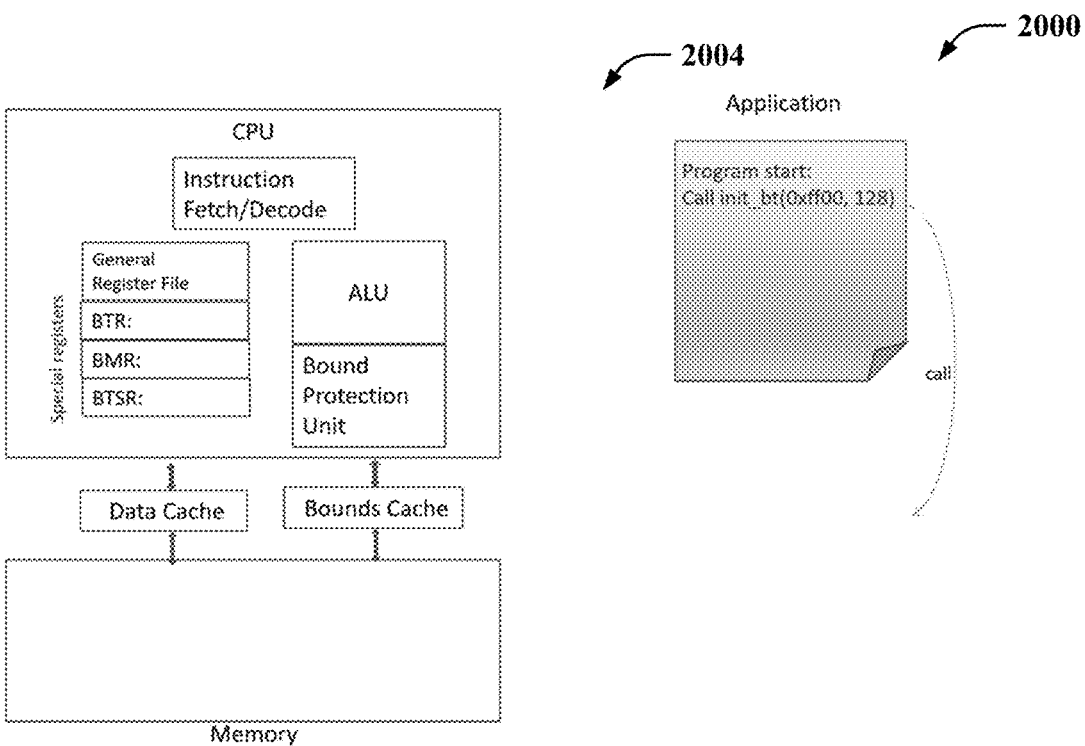
Figure 20C:
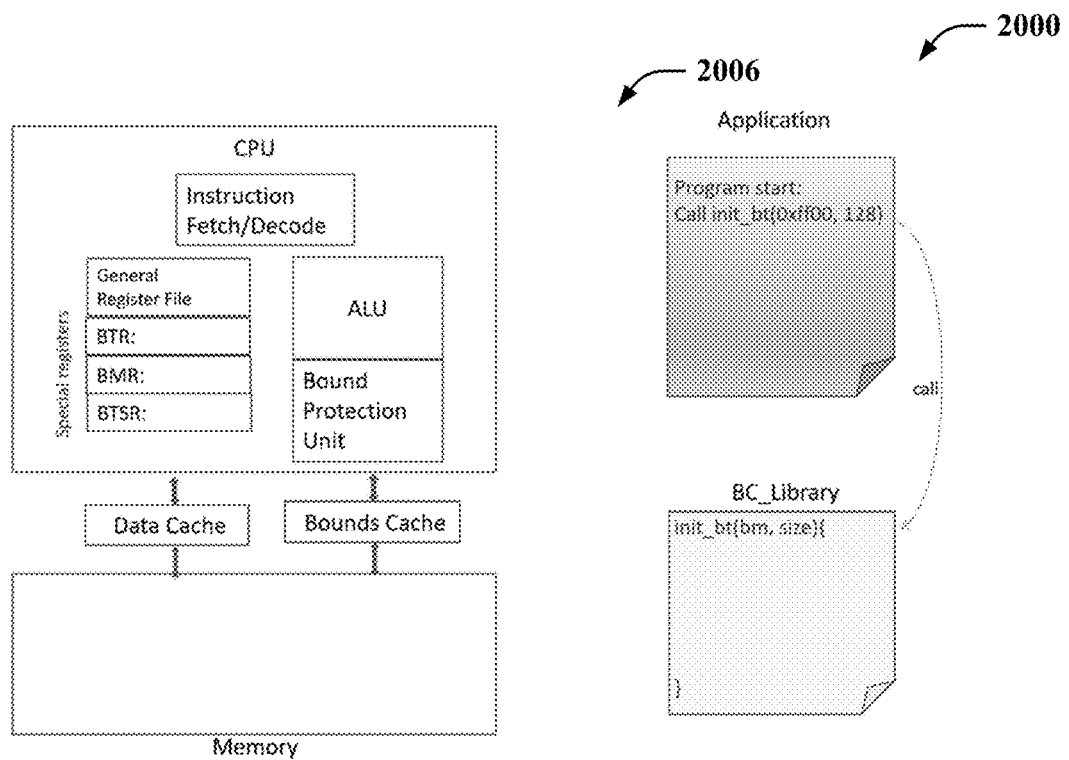
Figure 20D:
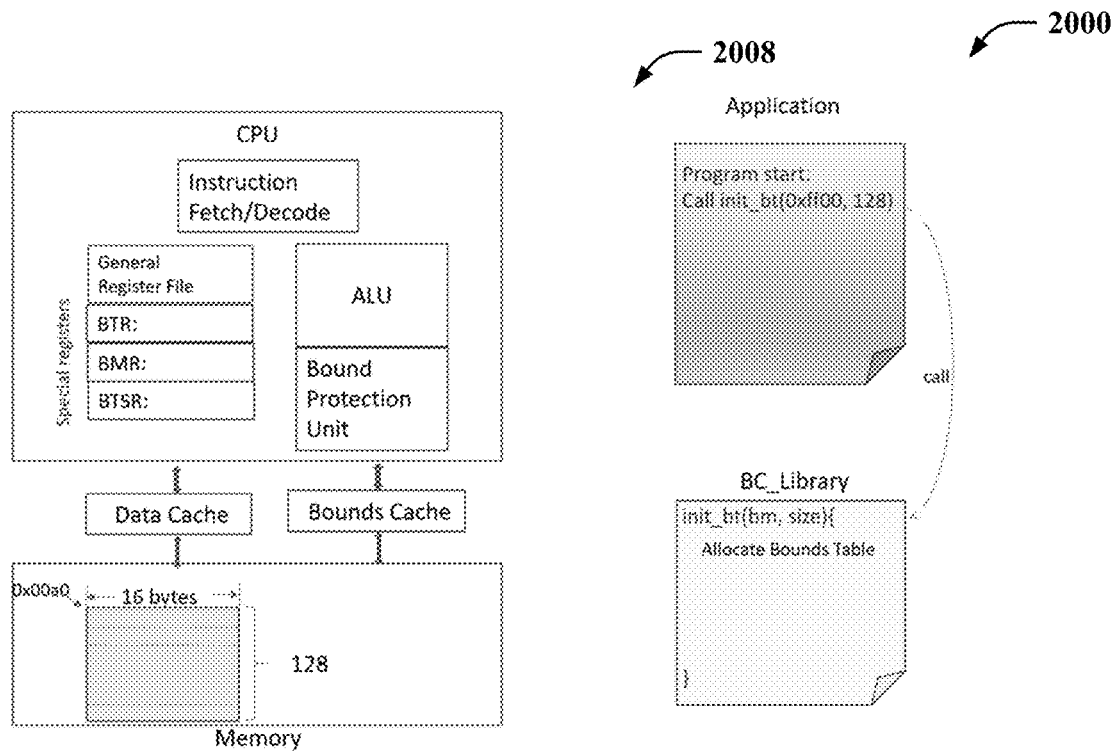
Figure 20E:
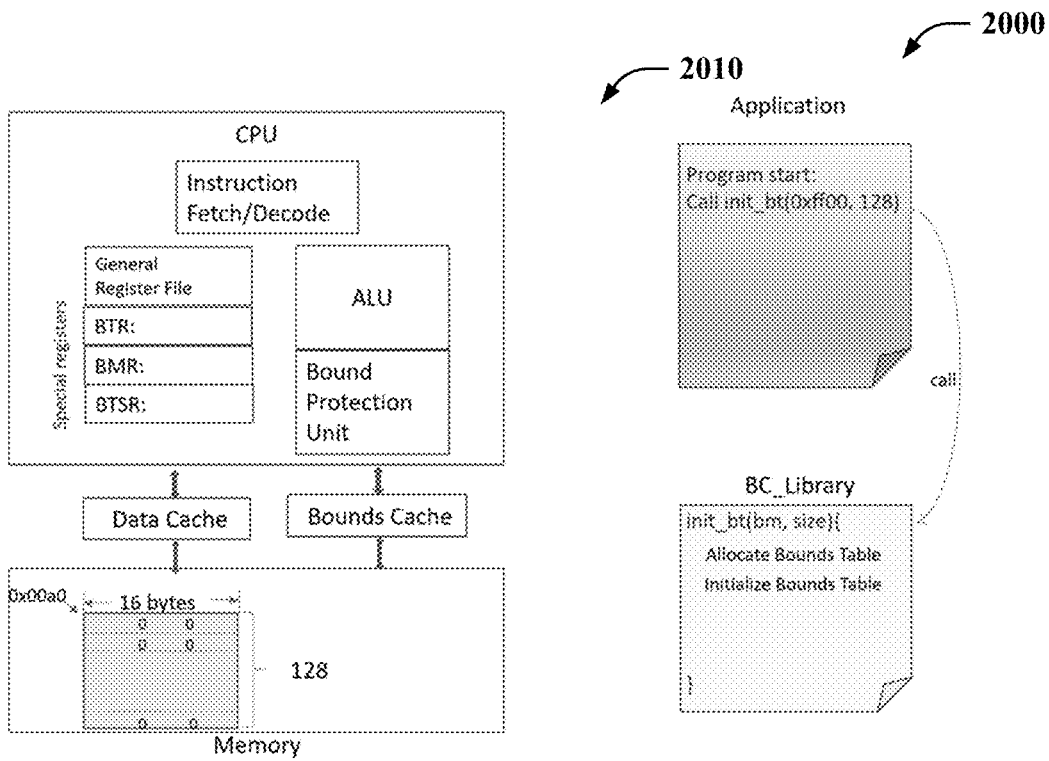

FIGS. 20A-20G illustrate an example, non-limiting operational flow 2000 for initializing a BITable in memory, in accordance with one or more embodiments described herein. As shown by FIG. 20A, operational flow 2000 includes a state 2002 in which an application or user program enters runtime. From state 2002, operational flow 2000 transitions to a state 2004 depicted in FIG. 20B. In state 2004, the application generates a BITable initialization call that includes two arguments. A first argument of the BITable initialization call includes a mask value (e.g., 0xff00) that defines which unused bits in a pointer will be used to store index information for a corresponding BIEntry in the BITable. The second argument of the BITable initialization call includes a size value (e.g., 128) that defines a number of BIEntries that are allocated for the BITable upon initialization. From state 2004, operational flow 2000 transitions to a state 2006 depicted in FIG. 20C.

In state 2006, the application issues the BITable initialization call to a bounds-checking library (BC_Library). From state 2006, operational flow 2000 transitions to a state 2008 depicted in FIG. 20D. In state 2008, a creation routine of the BC_Library creates the BITable in memory by allocating a region of the memory to the BITable based on the size value included in the BITable initialization call. From state 2008, operational flow 2000 transitions to a state 2010 depicted in FIG. 20E. In state 2010, an initialization routine of the BC_Library initializes the BITable by populating BIEntries of the BITable with initial values. From state 2010, operational flow 2000 transitions to a state 2012 depicted in FIG. 20F.

Figure 20F:
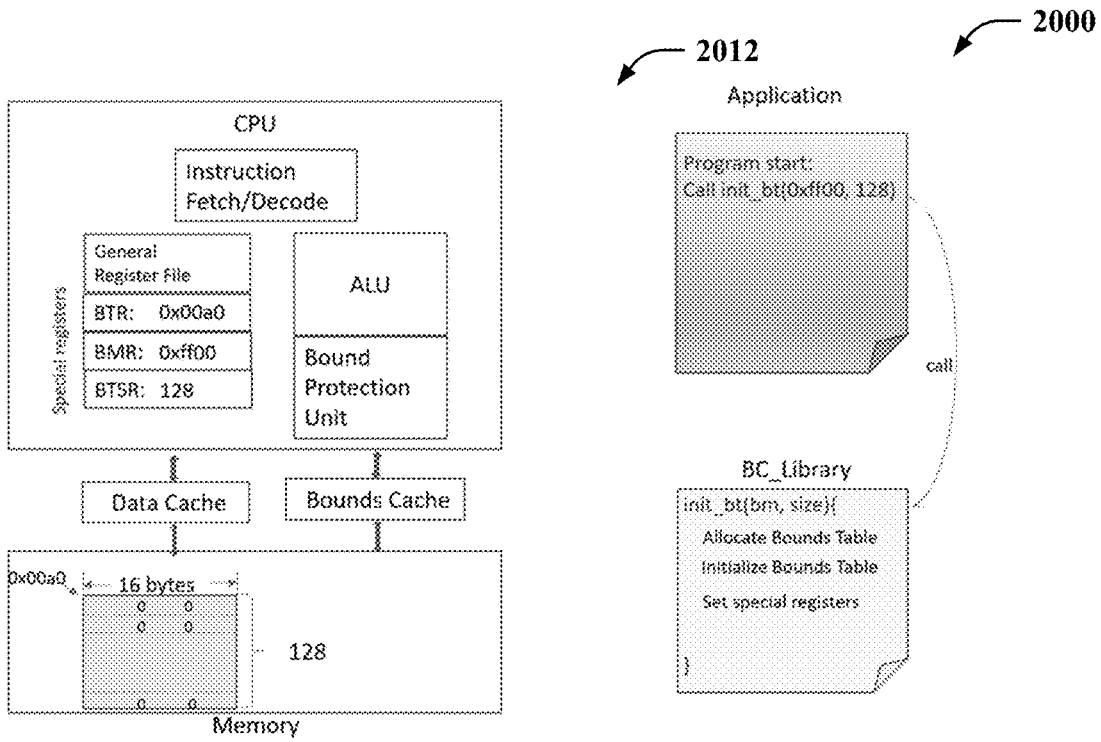
Figure 20G:
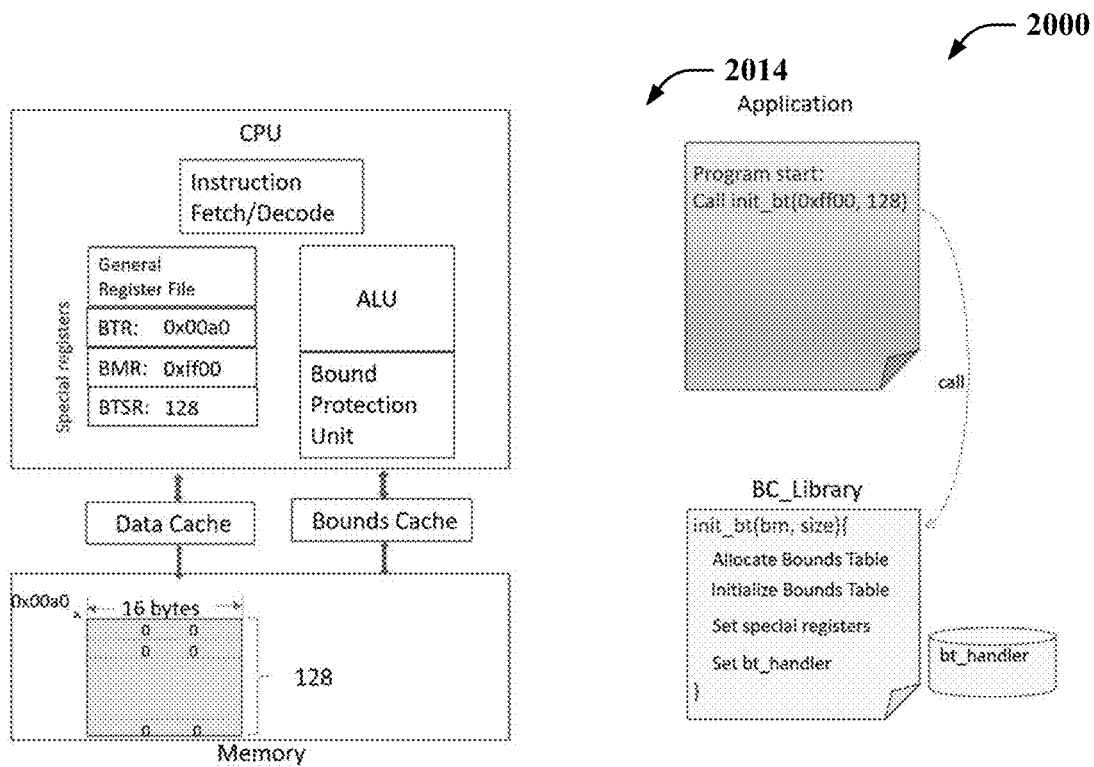

In state 2012, a special register routine of the BC_Library populates a plurality of special hardware registers with values corresponding to the BITable. As shown by FIG. 20F, the plurality of special hardware registers includes: a bounds table register (BTR), a bounds mask register (BMR), and a bounds table size register (BTSR). The BTR stores a base address of the BITable in the allocated region of memory. The BMR stores the mask value from the BITable initialization call the application issues to the BC_Library in state 2006. The BTSR stores the size value from the BITable initialization call the application issues to the BC_Library in state 2006 that defines the number of BIEntries comprising the BITable. From state 2012, operational flow 2000 transitions to a state 2014 depicted in FIG. 20G. In state 2014, a handler routine of the BC_Library sets a bt_handler that can be used to operate on the BITable. In an embodiment, the bt_handler is a global variable. In an embodiment, the bt_handler comprises a plurality of fields that store data related to: the base address of the BITable, the size value of the BITable initialization call, the mask value of the BITable initialization call, or a combination thereof.

Figure 21A:
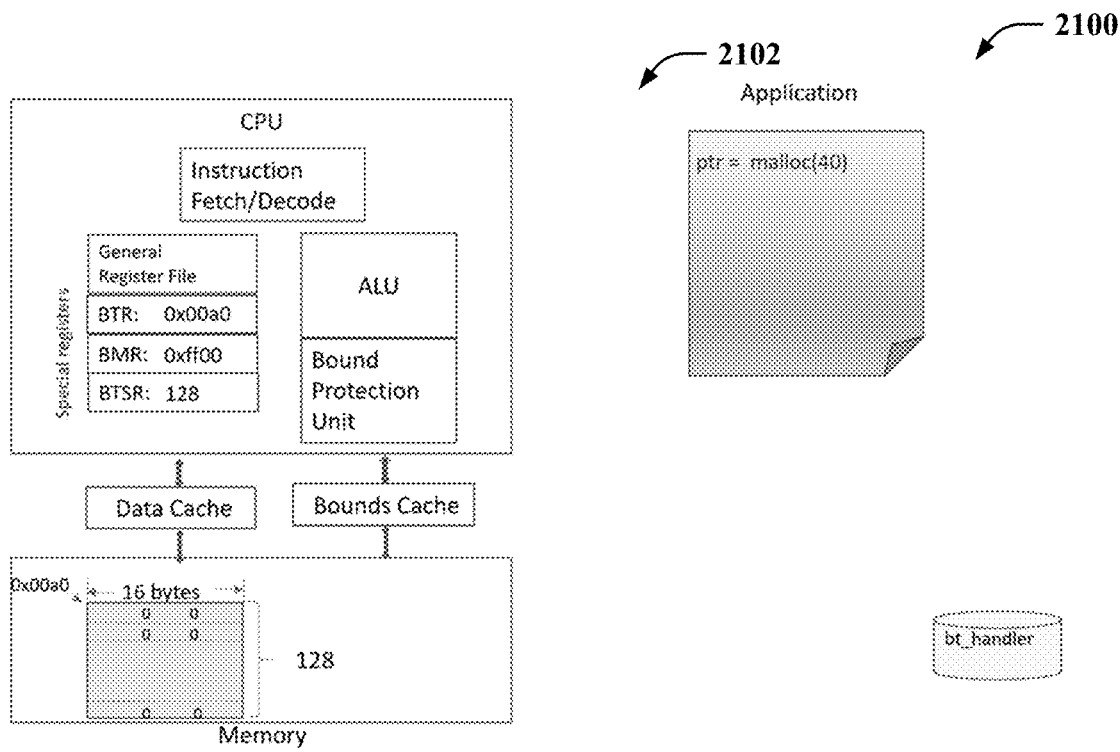
FIGS. 21A-21E illustrate an example, non-limiting operational flow for processing a memory allocation function, in accordance with one or more embodiments described herein.
Figure 21B:
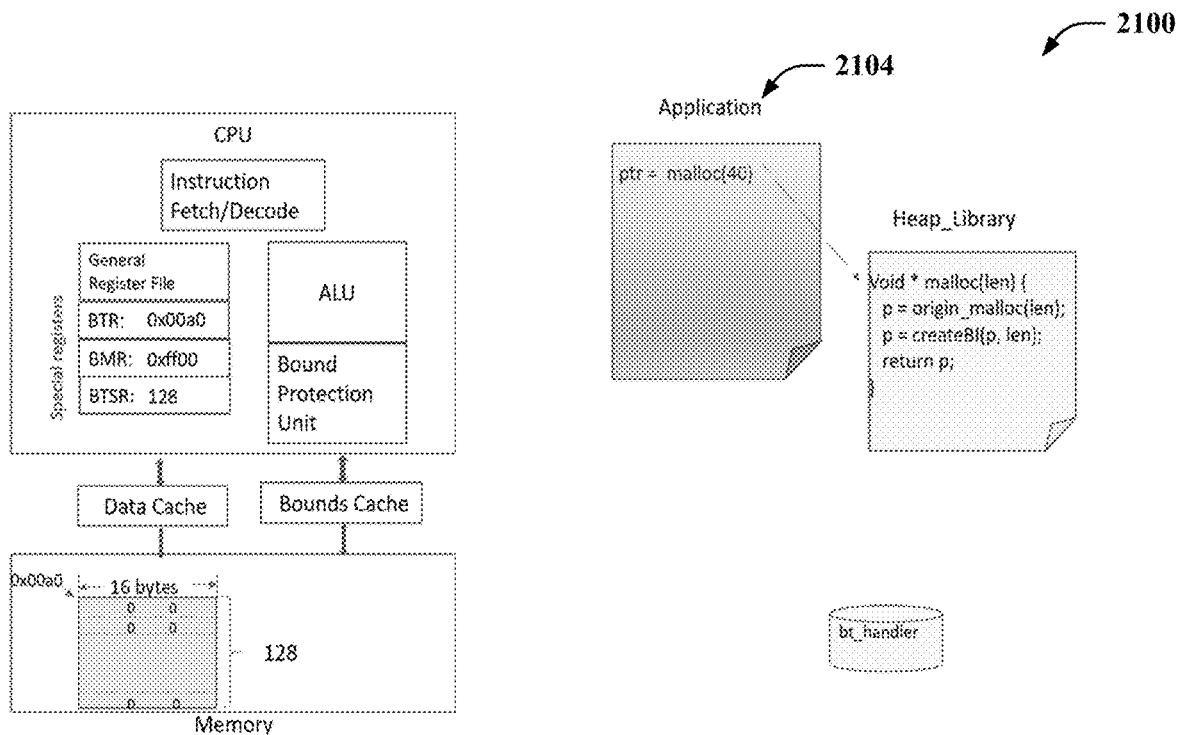
Figure 21C:
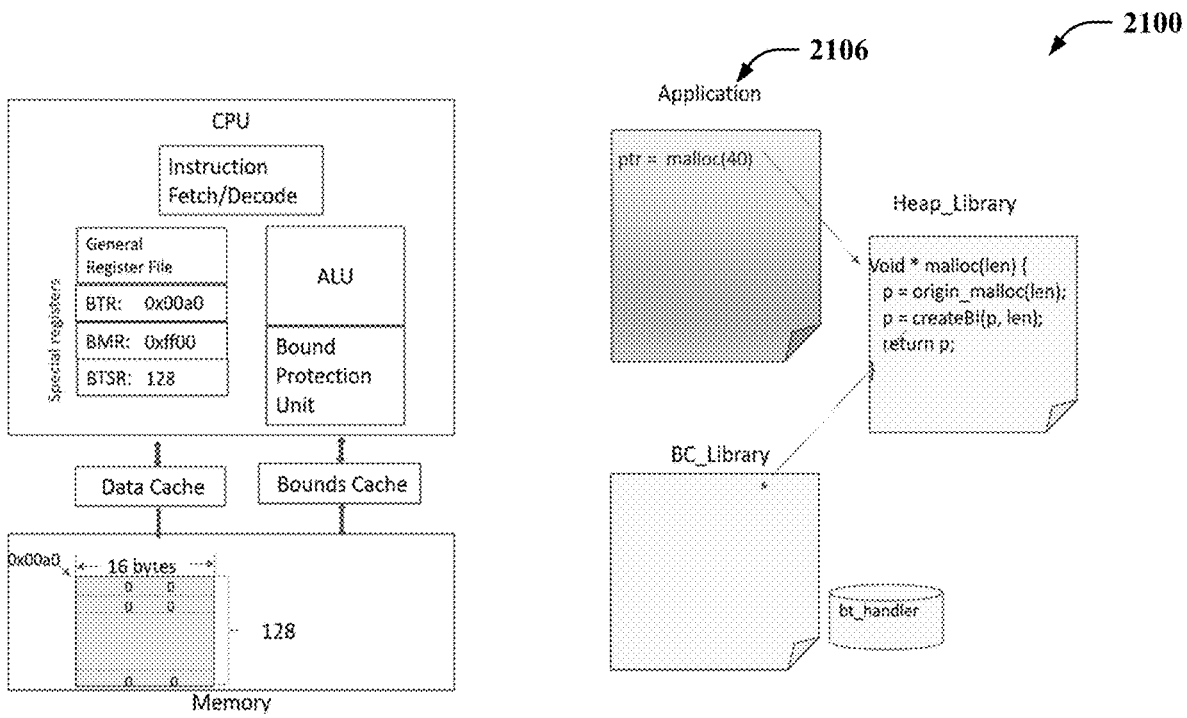
Figure 21D:
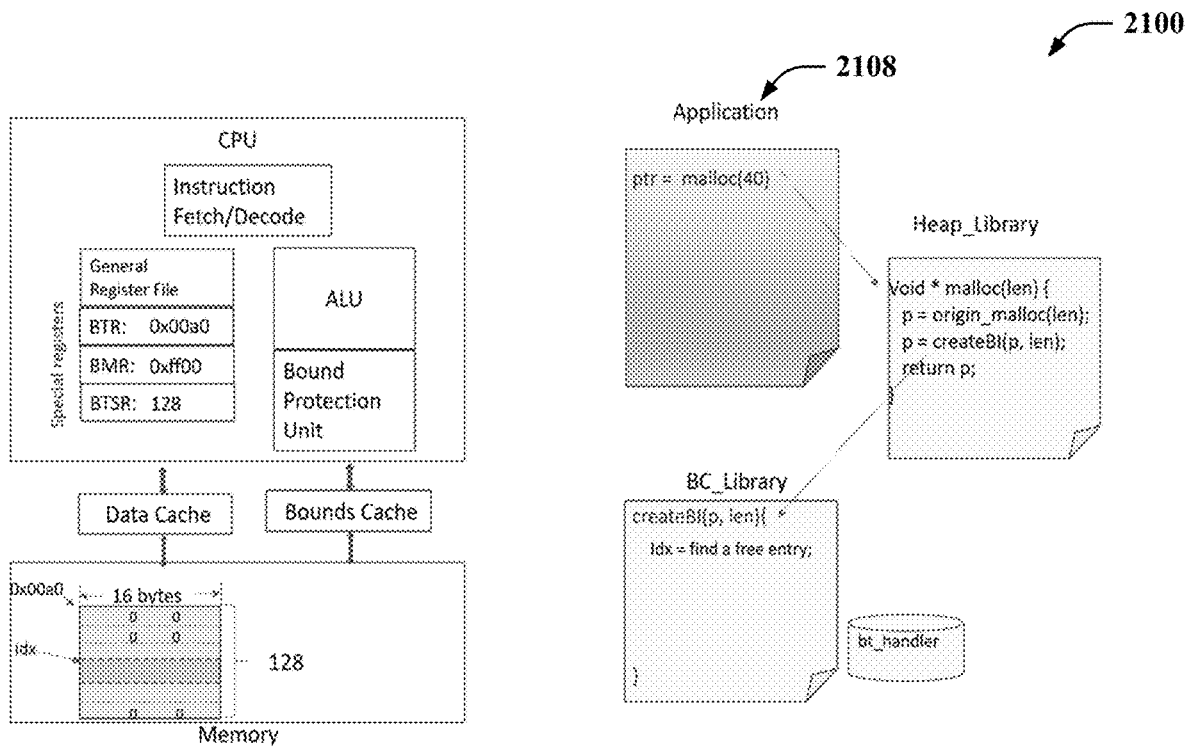
Figure 21E:
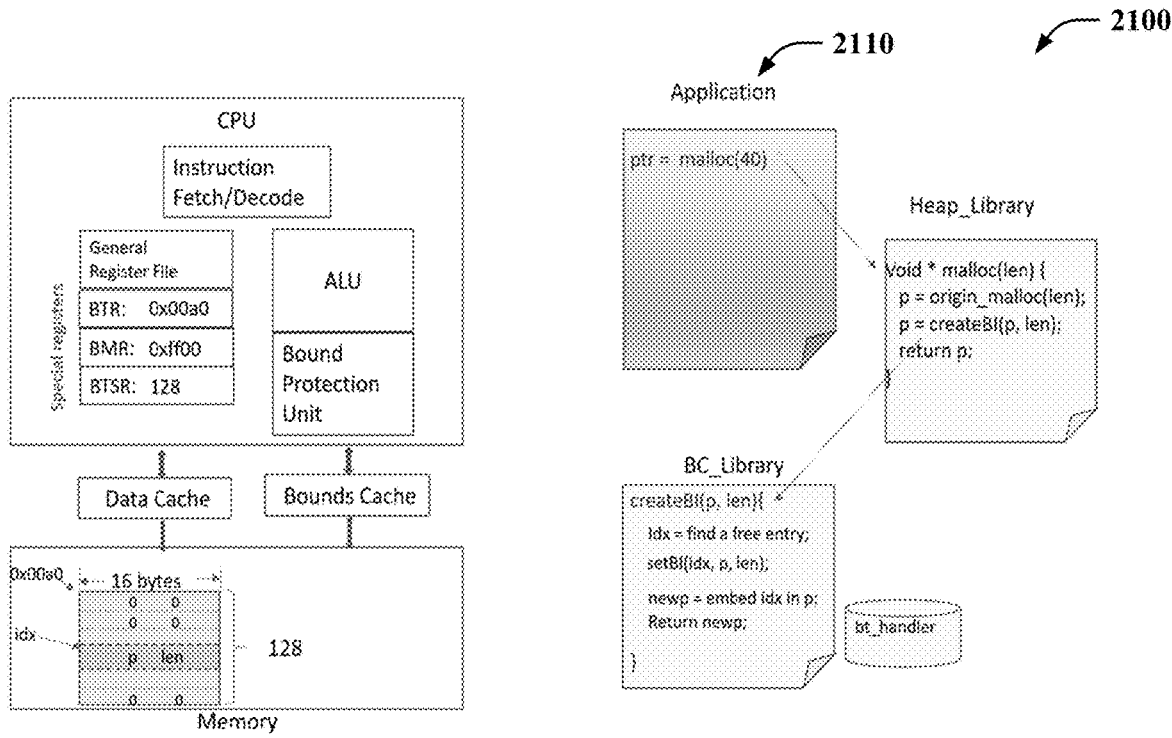

FIGS. 21A-21E illustrate an example, non-limiting operational flow 2100 for processing a memory allocation function, in accordance with one or more embodiments described herein. As shown by FIG. 21A, operational flow 2100 includes a state 2102 in which an application generates a memory allocation call for requesting memory region allocation. The memory allocation call includes an argument comprising a length value that defines a size of the requested memory region allocation. From state 2102, operational flow 2100 transitions to a state 2104 depicted in FIG. 21B. In state 2104, the application issues the memory allocation call to a memory allocation function of a heap library (Heap_Library). As shown by FIG. 21B, the memory allocation function generates a BIEntry creation call that includes two arguments for creating an entry in the BITable (p=createBI (p,len)). In addition, the memory allocation function processes the original memory allocation call and allocates the requested memory region (p=origin_malloc(len)). The two arguments of the BIEntry creation includes a first argument comprising a pointer value that defines a base address of the newly allocated memory region and a second argument comprising the length value that defines the size of the allocated memory region. From state 2104, operational flow 2100 transitions to a state 2106 depicted in FIG. 21C.

In state 2106, the memory allocation function of the HEAP_Library issues the BIEntry creation call to a BIEntry creation function of the BC_Library. From state 2106, operational flow 2100 transitions to a state 2108 depicted in FIG. 21D. In state 2108, the BIEntry creation function finds a free BIEntry within the BITable to store bounds-metadata associated with the allocated memory region. From state 2108, operational flow 2100 transitions to a state 2110 depicted in FIG. 21E. In state 2110, the BIEntry creation function populates the free BIEntry with the pointer value that defines the base address of the allocated memory region and the length value that defines the size of the allocated memory region. The BIEntry creation function further embeds an index value (idx) of the free BIEntry into the pointer value to create a new pointer value that is returned to the memory allocation function.

Figure 22A:
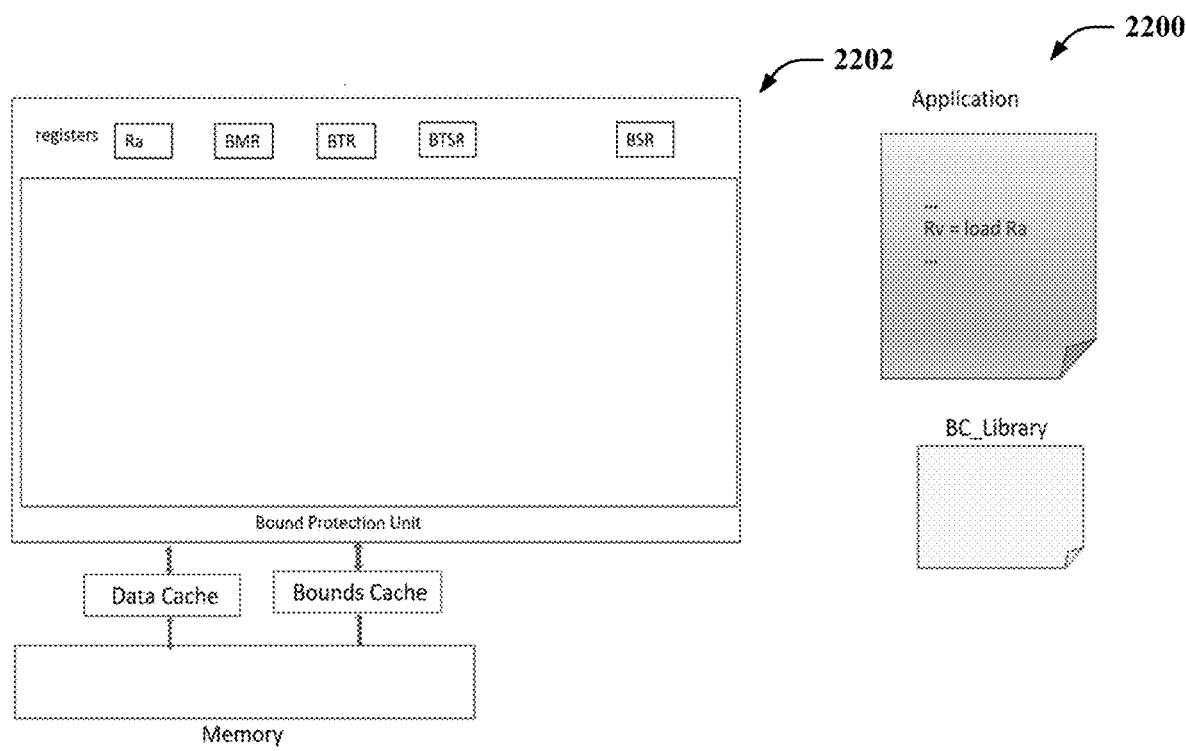
FIGS. 22A-22K illustrate an example, non-limiting operational flow for processing a load instruction, in accordance with one or more embodiments described herein.
Figure 22B:
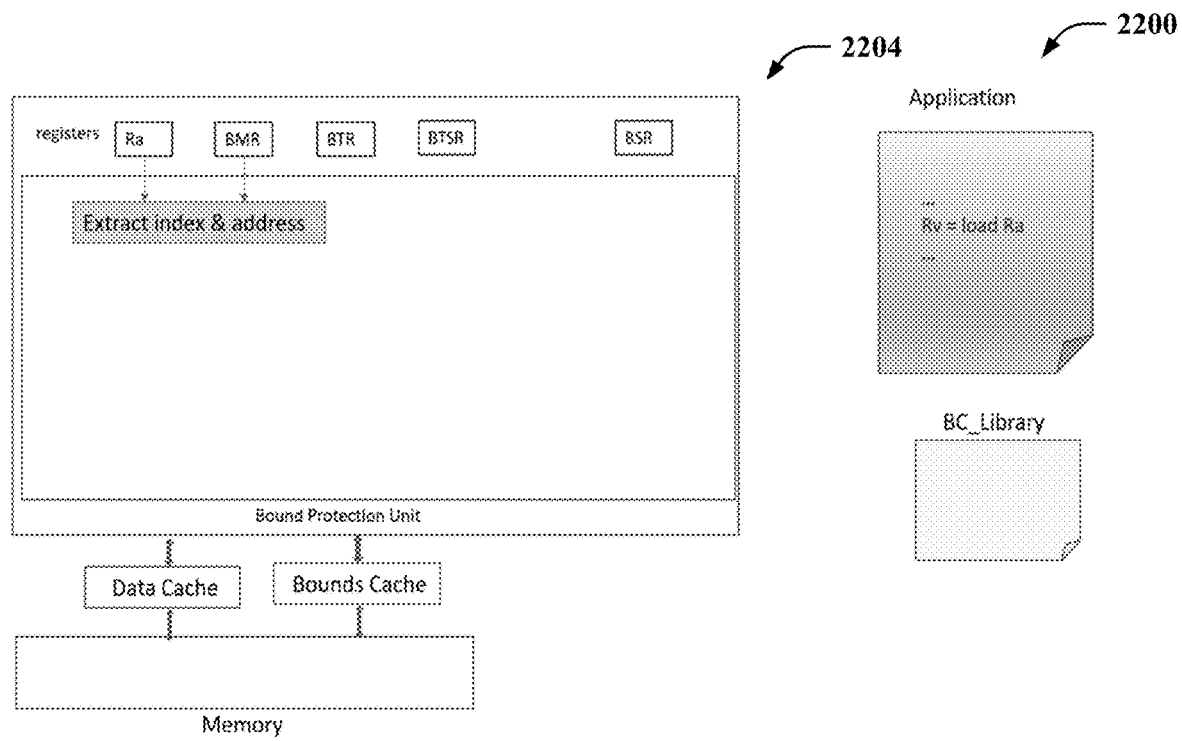
Figure 22C:
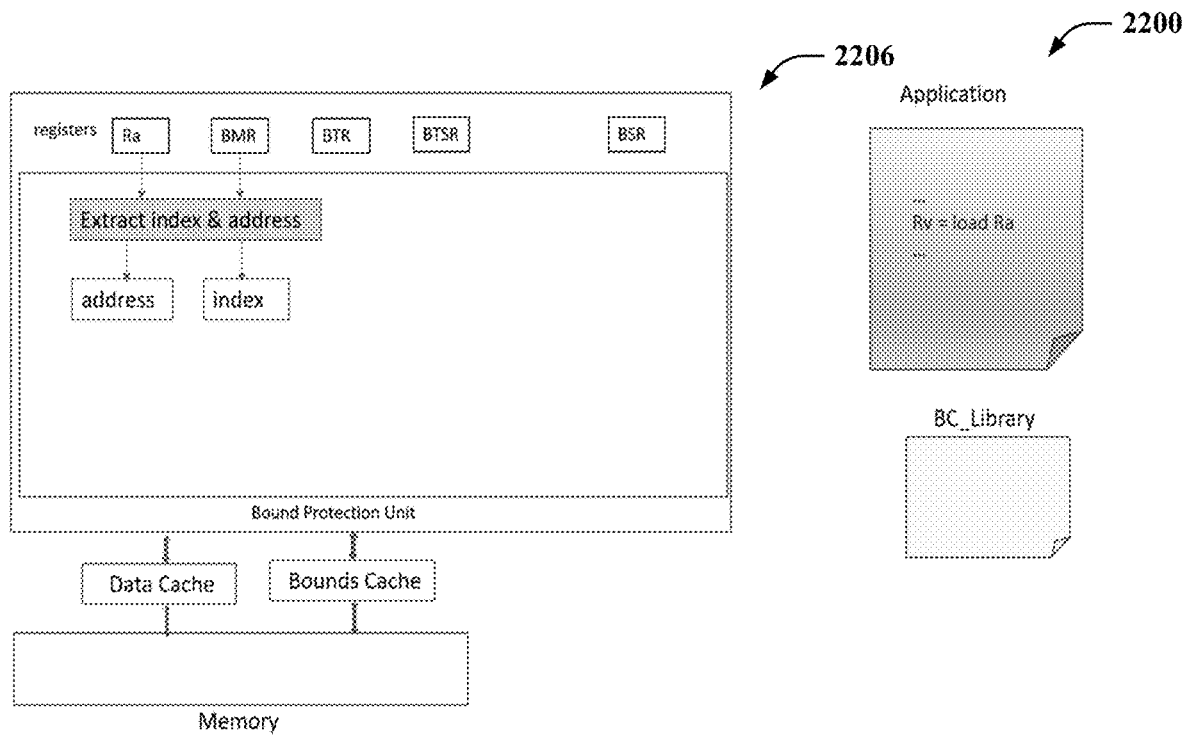
Figure 22D:
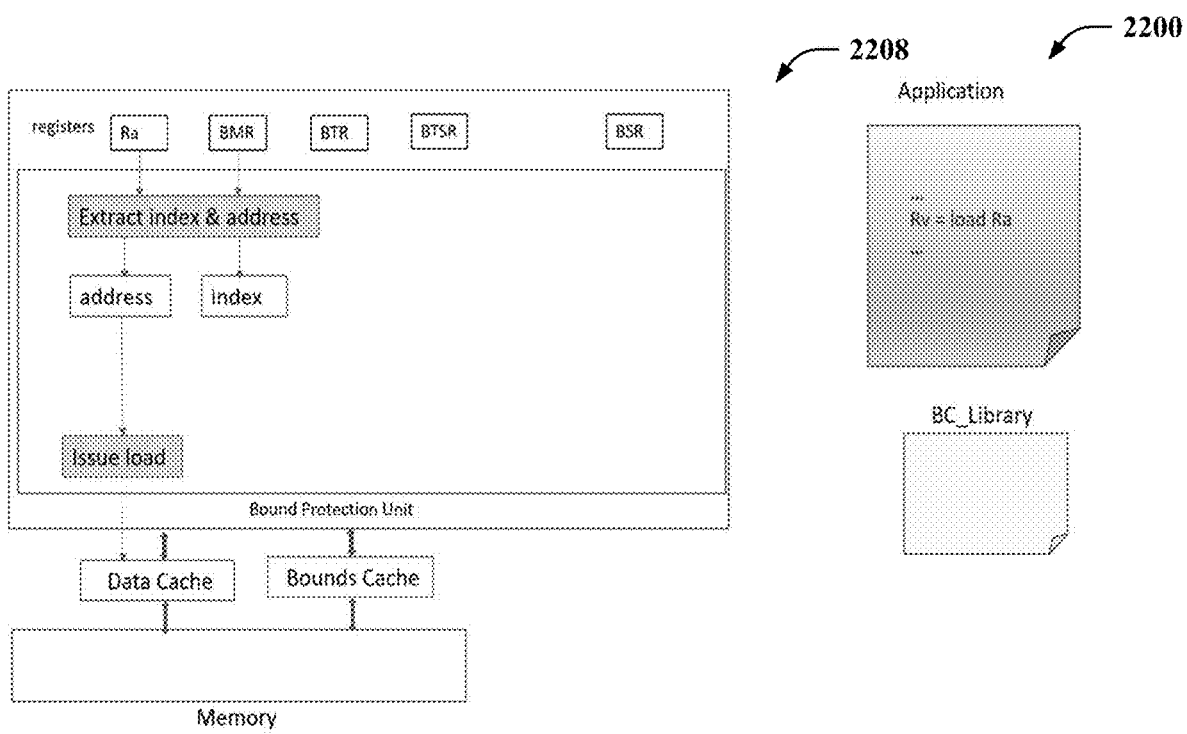
Figure 22E:
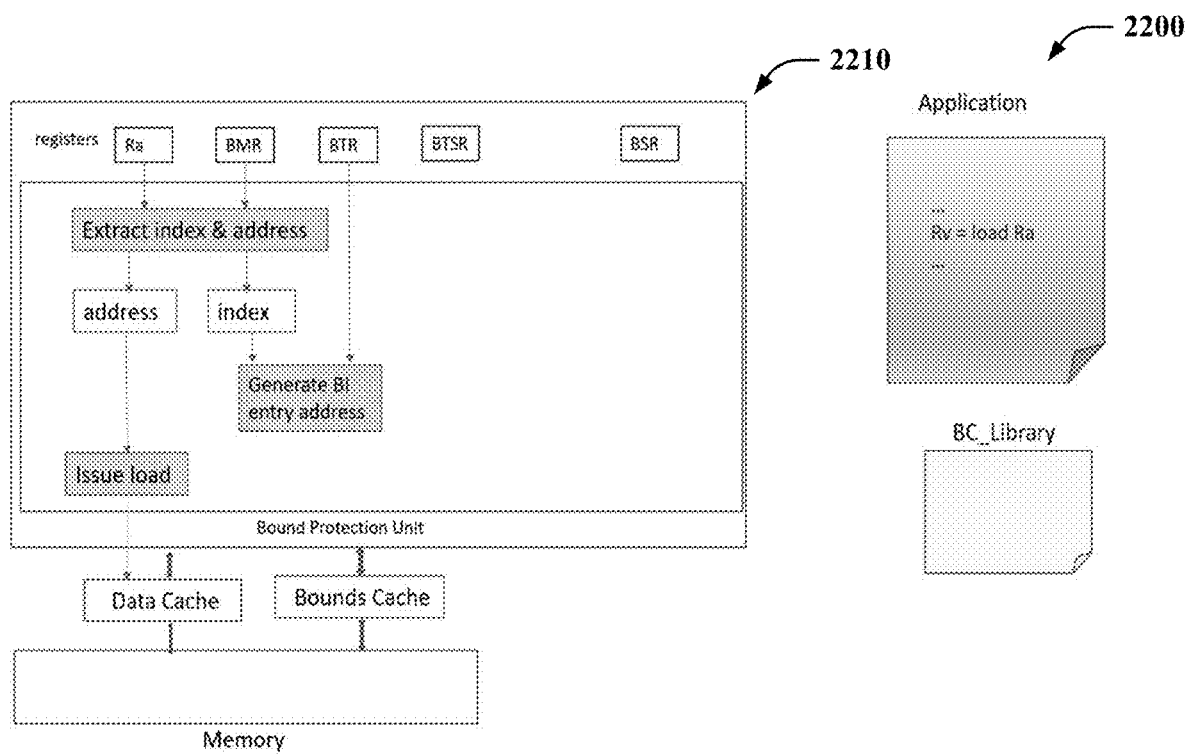
Figure 22F:
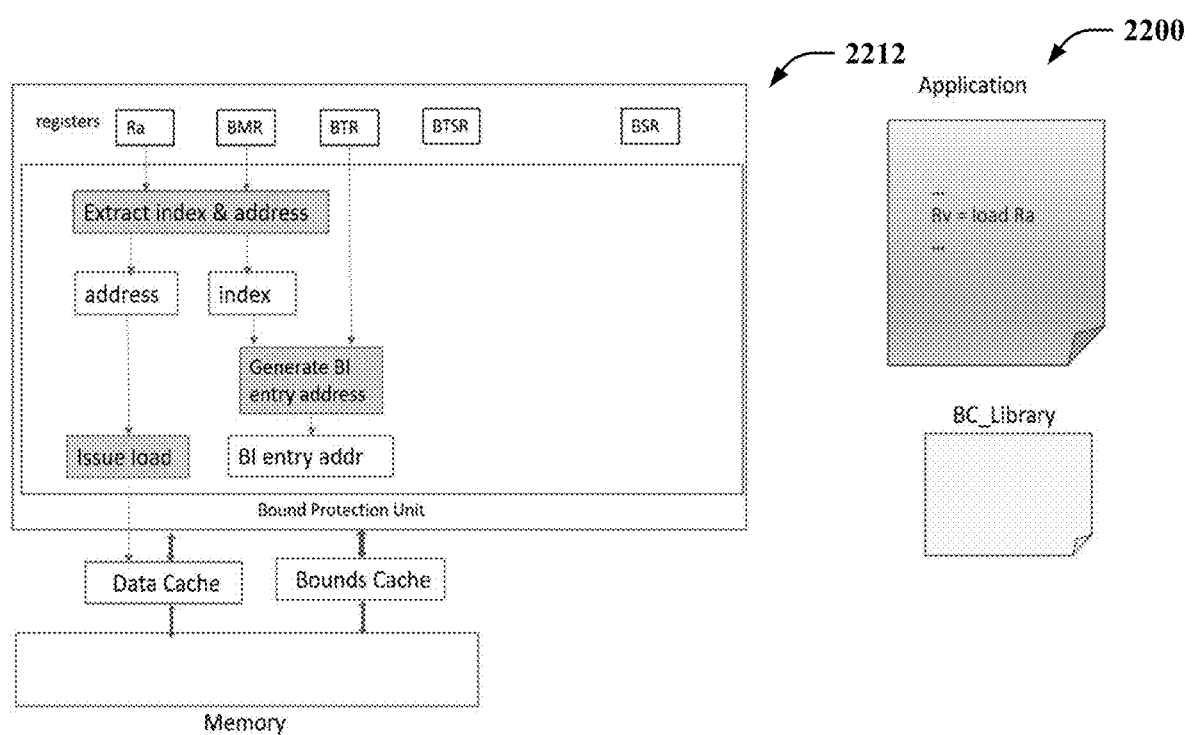
Figure 22G:
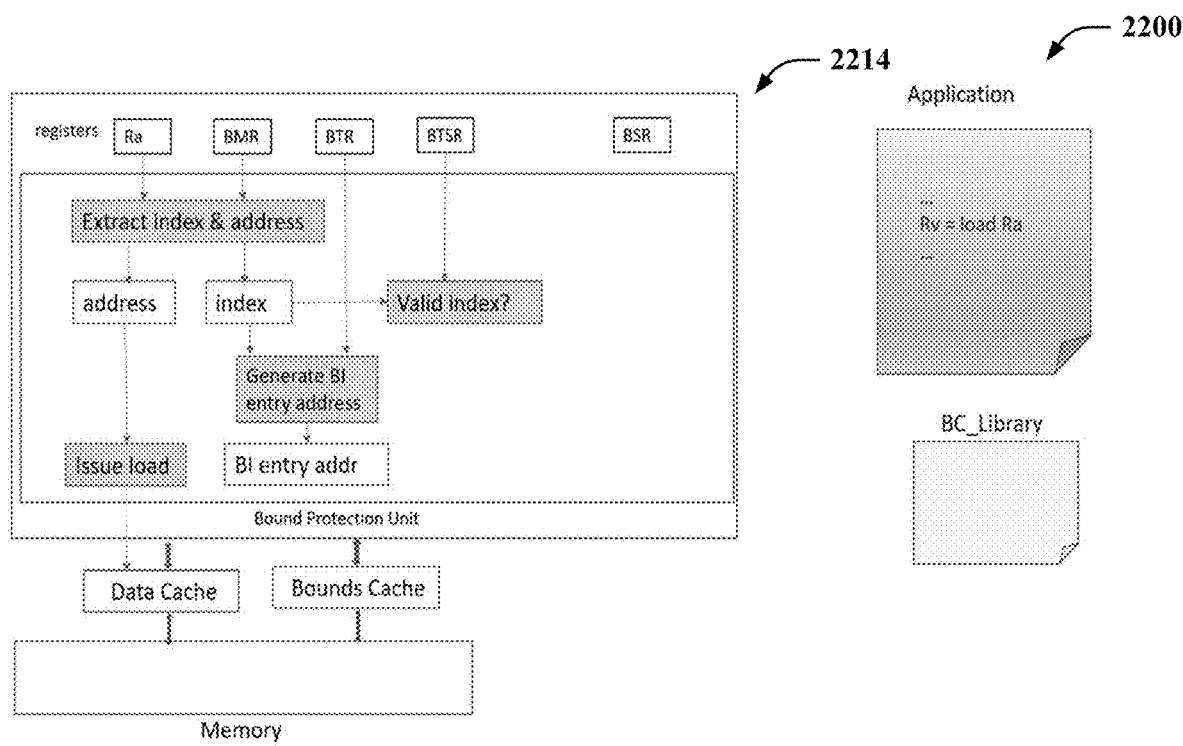
Figure 22H:
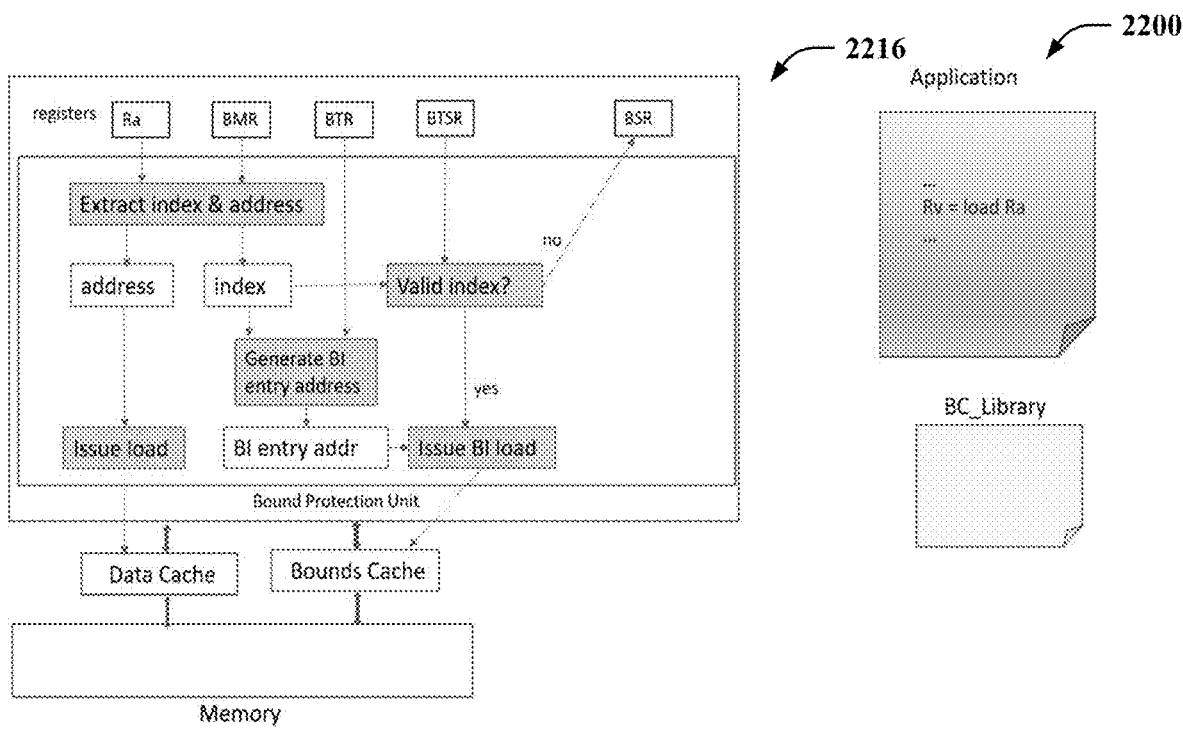
Figure 22I:
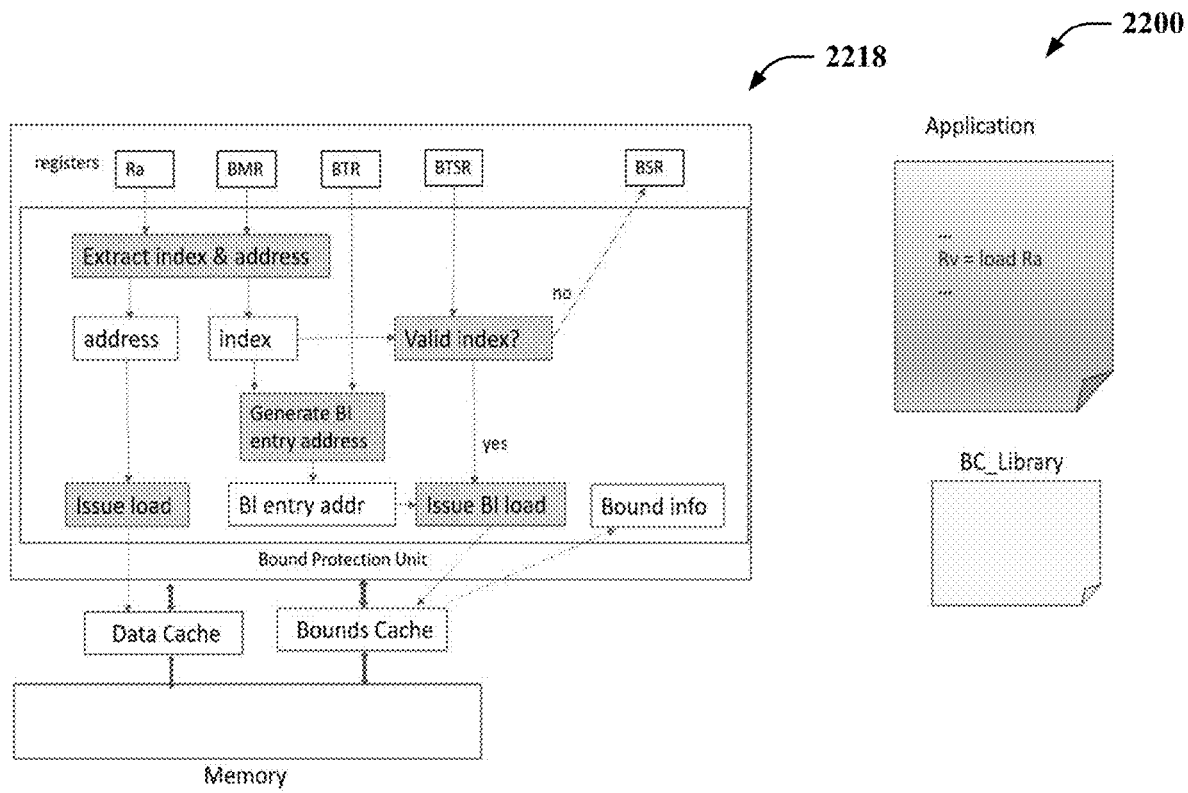
Figure 22J:
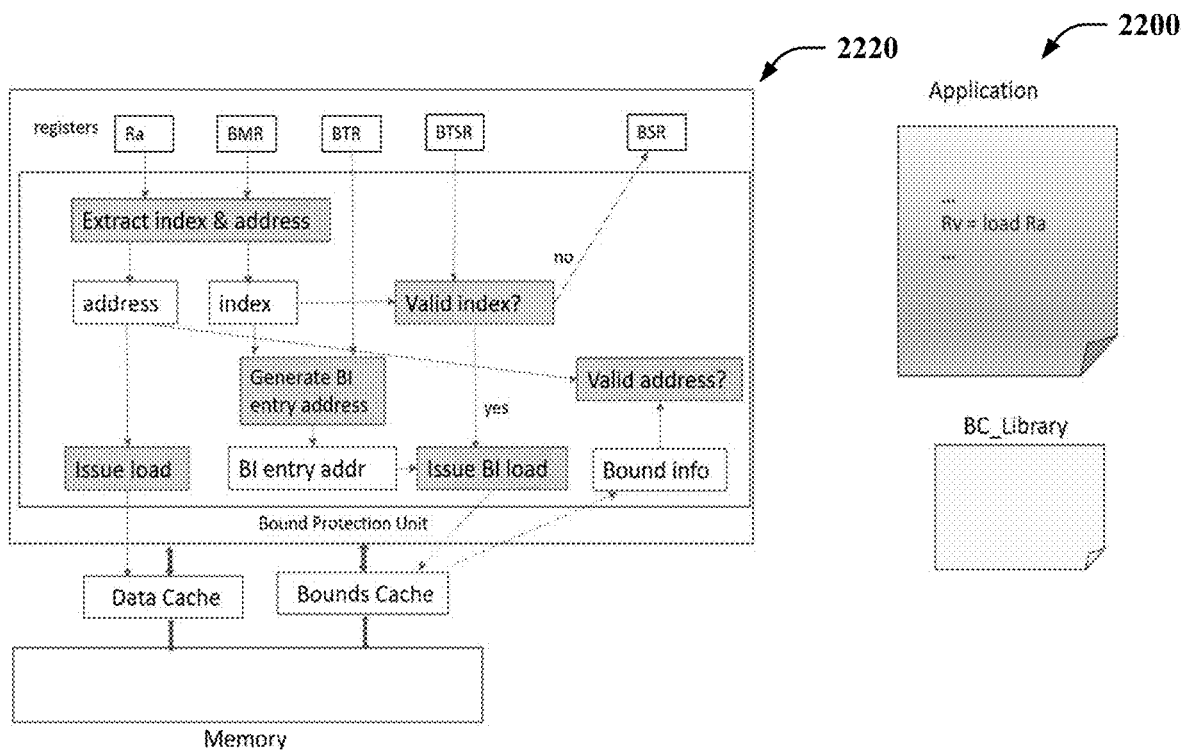
Figure 22K:
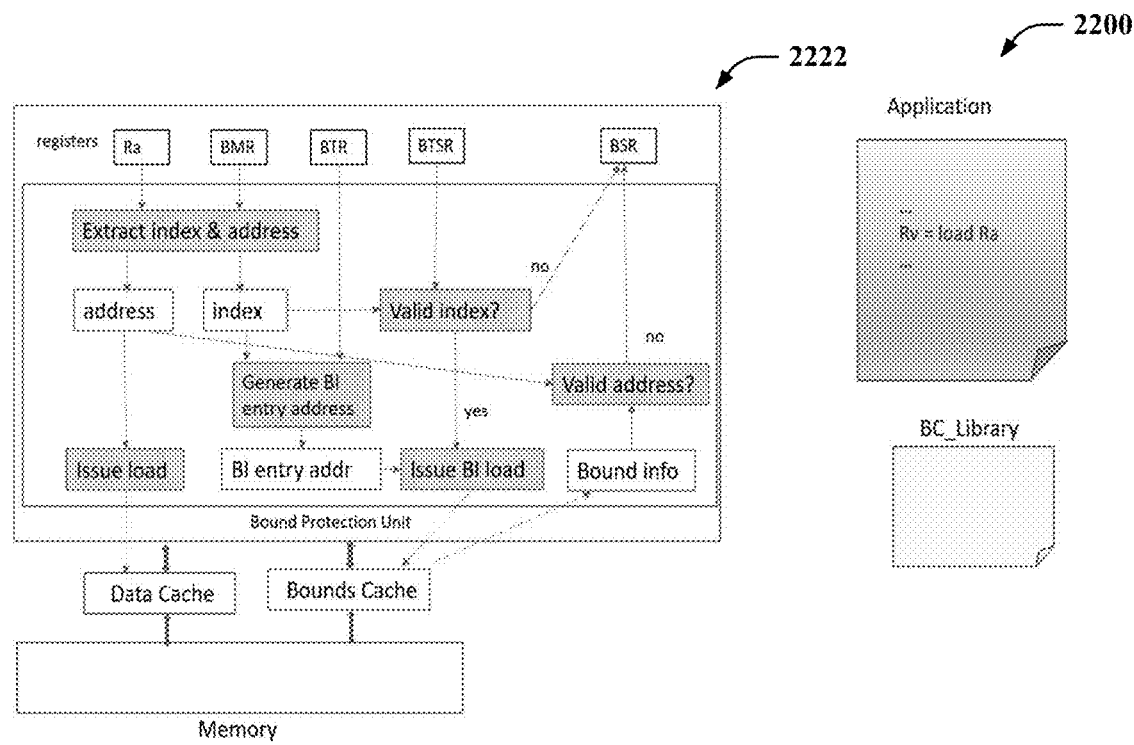

FIGS. 22A-22K illustrate an example, non-limiting operational flow 2200 for processing a load instruction, in accordance with one or more embodiments described herein. As shown by FIG. 22A, operational flow 2200 includes a state 2202 in which an application can execute a load instruction from an address Ra. From state 2202, operational flow 2200 transitions to a state 2204 depicted in FIG. 22B. In state 2204, a bound protection unit (BPU) can extract the address value and the mask value from the Ra register and the BMR. From state 2204, operational flow 2200 transitions to a state 2206 depicted in FIG. 22C. In state 2206, the BPU can extract a memory address of a heap object associated with the load instruction and an index value from the address and mask values. From state 2206, operational flow 2200 transitions to a state 2208 depicted in FIG. 22D. In state 2208, the memory address derived from Ra and the mask value can be utilized by the load instruction to load bytes from the heap object. From state 2208, operational flow 2200 transitions to a state 2210 depicted in FIG. 22E.

In state 2210, the BPU can use the BTR, which contains the base address of the BITable associated with the application and the index derived from Ra and the BMR to determine the address of a BIEntry corresponding to address Ra. From state 2210, operational flow 2200 transitions to a state 2212 depicted in FIG. 22F. In state 2212, the BPU uses the address of the BIEntry determined in state 2210 to obtain the appropriate BIEntry for the load instruction. From state 2212, operational flow 2200 transitions to a state 2214 depicted in FIG. 22G. In state 2214, the BPU can compare the index value with a size value of the BITable retrieved from the BTSR to evaluate whether the index value is valid. From state 2214, operational flow 2200 transitions to a state 2216 depicted in FIG. 22H.

In state 2216, the BPU can generate an exception value and store the exception value in a bounds status register (BSR) if the evaluation of state 2214 determines the index value to be invalid. Alternatively, the BPU can issue a BI load instruction comprising the BIEntry address to the Bounds Cache if the evaluation of state 2214 determines the index value to be valid. From state 2216, operational flow 2200 transitions to a state 2218 depicted in FIG. 22I. In state 2218, the BPU can obtain bounds-metadata corresponding to the heap object from the Bounds Cache responsive to the BI load instruction if the Bounds Cache comprises that bounds-metadata. Alternatively, the BPU can obtain the bounds-metadata corresponding to the heap object from the BITable in memory responsive to the BI load instruction if the Bounds Cache does not comprise that bounds-metadata. From state 2218, operational flow 2200 transitions to a state 2220 depicted in FIG. 22J.

In state 2220, the BPU can compare the bounds-metadata with the memory address of the heap object extracted in state 2206 to evaluate whether the memory address to be loaded is valid. From state 2220, operational flow 2200 transitions to a state 2222 depicted in FIG. 22K. In state 2222, the BPU can generate an exception value and store the exception value in the BSR if the evaluation of state 2220 determines the memory address to be invalid. Alternatively, the BPU can allow the load instruction executed by the application to proceed if the evaluation of state 2220 determines the memory address of the heap object to be valid.

Figure 23:
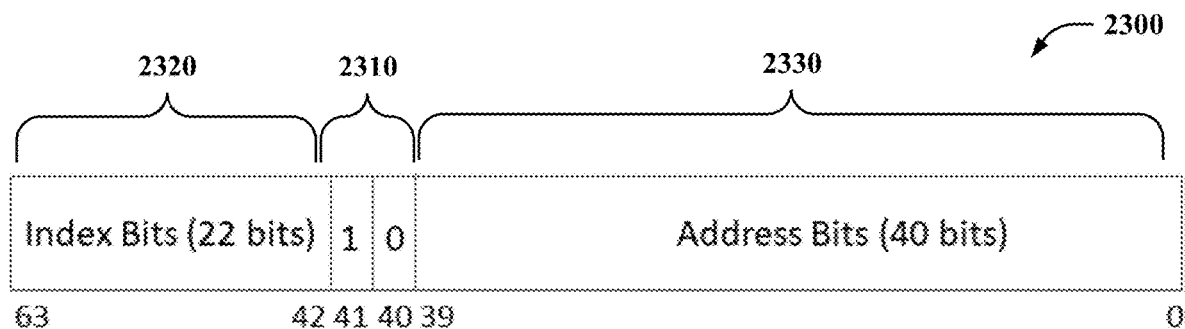
FIG. 23 illustrates an example, non-limiting pointer, in accordance with one or more embodiments described herein.

FIG. 23 illustrates an example, non-limiting pointer 2300, in accordance with one or more embodiments described herein. In some instances, as a result of array indexing or pointer arithmetic, the arithmetic can "overflow" into and "corrupt" the unused bits (or index bits) of a pointer that are used as an index into the BITable. For an out-of-bounds reference to be undetected in such instances, the corrupted index value would need to reference a valid BIEntry in the BITable and the pointer value bits (or address bits) of the pointer would need to correspond to a valid address within the bounds of that BIEntry. While the likelihood of this occurring can be low, pointers can be modified to reduce the likelihood of or avoid such occurrences. To that end, pointer 2300 comprises guard bits 2310 (e.g., bits 41 and 40) that facilitate a guard band between index bits 2320 (e.g., bits 42 through 63) and address bits 2330 (e.g., bits 0 through 39). Guard bits 2310 can protect the index bits 2320 when a "moderately sized" offset is added to or subtracted from an address, as discussed in greater detail below with respect to FIGS. 24-25.

Figure 24:
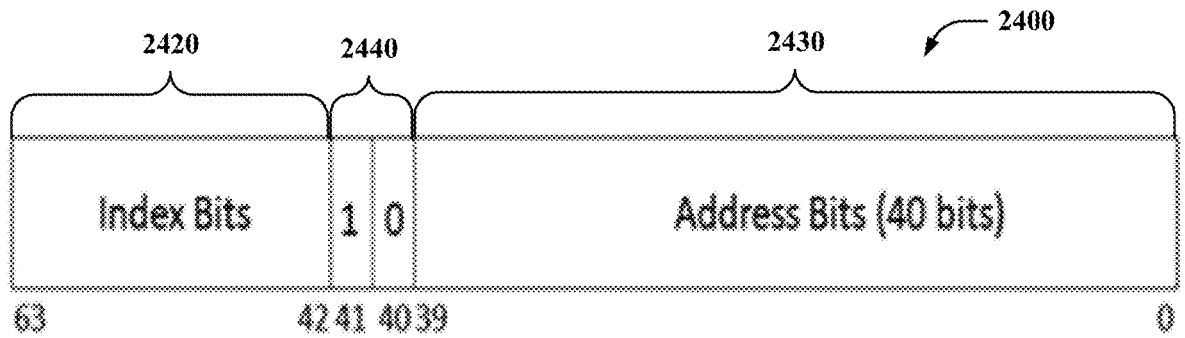
FIG. 24 illustrates an example, non-limiting pointer, in accordance with one or more embodiments described herein.

FIG. 24 illustrates an example, non-limiting pointer 2400, in accordance with one or more embodiments described herein. As shown by FIG. 24, pointer 2400 includes index bits 2420, address bits 2430, and guard bits 2440 intervening between index bits 2420 and address bits 2430. In FIG. 24, the guard bits comprise binary values of "10" reading from left to right. Adding a moderately sized offset (e.g., $<2^{40}$) to pointer 2400 can result in a carry that flips a lower bit (e.g., bit 40) of the guard bits 2440 from a binary value of "0" to a binary value of "1", but it would not overflow into and corrupt the index bits 2420. Moreover, subtracting a moderately sized offset from pointer 2400 can result in a borrow that flips bit 41 of the guard bits 2440 from a binary value of "1" to a binary value of "0", but it would not overflow into and corrupt the index bits 2420.

Figure 25:
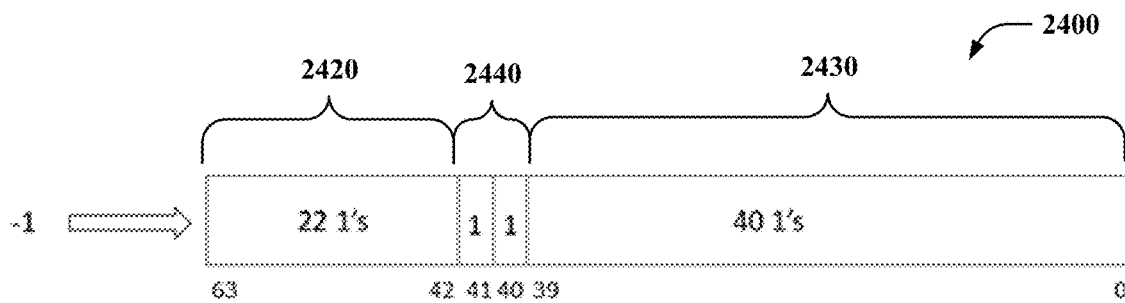
FIG. 25 illustrates an example, non-limiting addition operation performed on pointer of FIG. 24.

For example, as shown in FIG. 25, negative binary value of "1" can be added to pointer value 2400 (or a binary value of "1" can be subtracted from pointer value 2400). The addition of the negative binary value of "1" in an upper bit (e.g., bit 41) of the guard bits 2440 can result in a carry that effectively zeros out binary values of "1" to the left of bit 41 in the 64-bit representation of the negative 1. As such, the bits to the left of bit 41 in the sum will equal those bits in the original address represented by pointer 2400 in FIG. 24. The index bits corruption mitigation technique discussed above with respect to FIGS. 23-25 facilitates an application or user program using >1 terabyte (TB) of address space and tracking bounds information for >4 million arrays. That technique does so while preventing out-of-bounds array references and eliminating or mitigating "index corruption" in pointer arithmetic associated with moderately sized offsets (e.g., $<2^{40}$).

Figure 26:
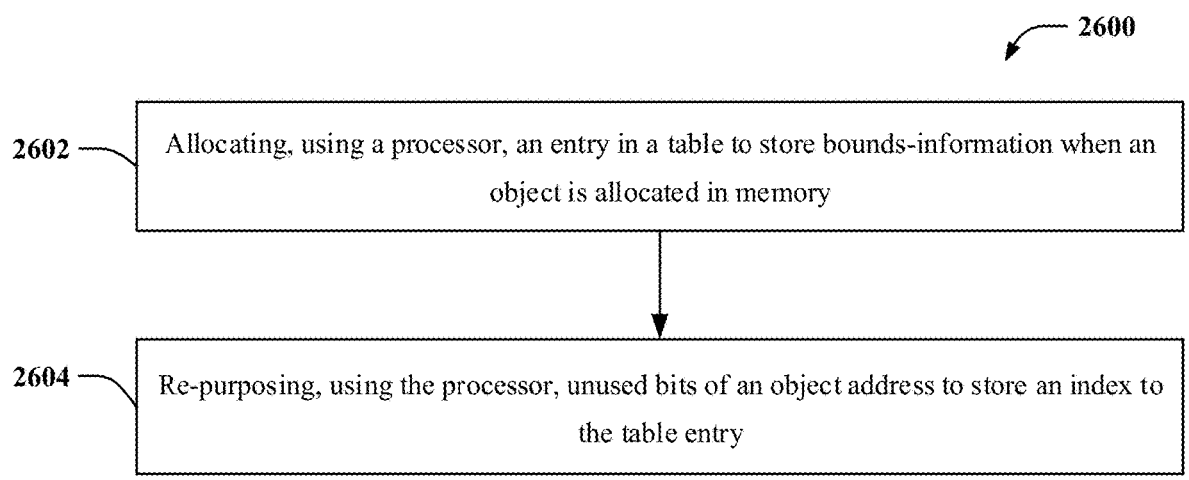
FIG. 26 illustrates a flow diagram of an example, non-limiting computer-implemented method that can facilitate hardware-based memory-error mitigation for heap-objects, in accordance with one or more embodiments described herein.

FIG. 26 illustrates a flow diagram of an example, non-limiting computer-implemented method 2600 of facilitating hardware-based memory-error mitigation for heap-objects, in accordance with one or more embodiments described herein. Repetitive description of like elements employed in other embodiments described herein is omitted for sake of brevity.

At 2602, the computer-implemented method 2600 can comprise allocating, using a processor (e.g., with entry component 240), an entry in a table to store bounds-information when an object is allocated in memory. At 2604, the computer-implemented method 2600 can comprise re-purposing, using the processor (e.g., with re-purpose component 250), unused bits of an object address to store an index to the table entry.

In an embodiment, the computer-implemented method 2600 can further comprise executing, using the processor (e.g., with checking component 260), bounds-checking in hardware on load and store instructions by using index bits in an address to access the bounds-information. In an embodiment, the computer-implemented method 2600 can further comprise automatically propagating, using the processor (e.g., with propagation component 270), the index when subsequent object addresses are derived via assignment statements or pointer arithmetic. In an embodiment, the computer-implemented method 2600 can further comprise checking, using the processor, array bounds. In an embodiment, the computer-implemented method can further comprise determining, using the processor, if an array reference is in-bounds or out-of-bounds. In an embodiment, the computer-implemented method 2600 can further comprise mitigating, using the processor, occurrence of out-of-bounds array references.

In an embodiment, the computer-implemented method 2600 can further comprise employing, using the processor, un-used bits in the object address to check a range of memory addresses that can be accessed. In an embodiment, the computer-implemented method 2600 can further comprise propagating, using the processor, extra information in unused bits when the object address is copied in an assignment statement. In an embodiment, the computer-implemented method 2600 can further comprise propagating, using the processor, extra information in unused bits when the object address is passed as an argument in a function call. In an embodiment, the computer-implemented method 2600 can further comprise propagating, using the processor, extra information in unused bits when the object address is used to compute an address.

Although the preceding discussion has focused on protecting against erroneous memory references for heap objects, the mechanisms discussed can also be applied to other kinds of objects including global objects and objects allocated on the stack. Global objects can be protected by allocating BIEntries in the BITable at program startup for each of the global objects in a program. Stack objects can also be protected. One way to do this involves an additional pre-processing step that pre-processes the source language files (e.g. the C or C++ files) that comprise a program. The pre-processing of a source language file can involve a static analysis that determines for each function in the file whether the function can call itself recursively either directly or indirectly. If a function does not call itself recursively then the pre-processor can edit the function to translate the declarations of automatic objects in the function to static objects. Then at program startup, BIEntries for these static objects can be allocated similar to the way BIEntries can be allocated for global objects as described above. Objects in functions that can be called recursively can be handled differently. In this case, another processing step can edit the prolog and epilog of a function to include code to allocate and free BIEntries for each of the objects in the function. Alternatively, all recursive and non-recursive functions can be handled the same way, by editing the prolog and epilog of each function to include code to allocate and free appropriate BIEntries.

It's also possible to protect against the use of uninitialized pointers by assigning a value of NULL, i.e. 0, when a pointer is defined. This will protect a program from de-referencing bugs in which 'garbage' in an uninitialized pointer is used to read or write memory.

One other point worth mentioning is that a program can be built to either include or not include the protection mechanisms that have been described. With an appropriate 'make' flag, say, a program can be built without the protection mechanisms if desired and without any performance penalty.

Figure 27:
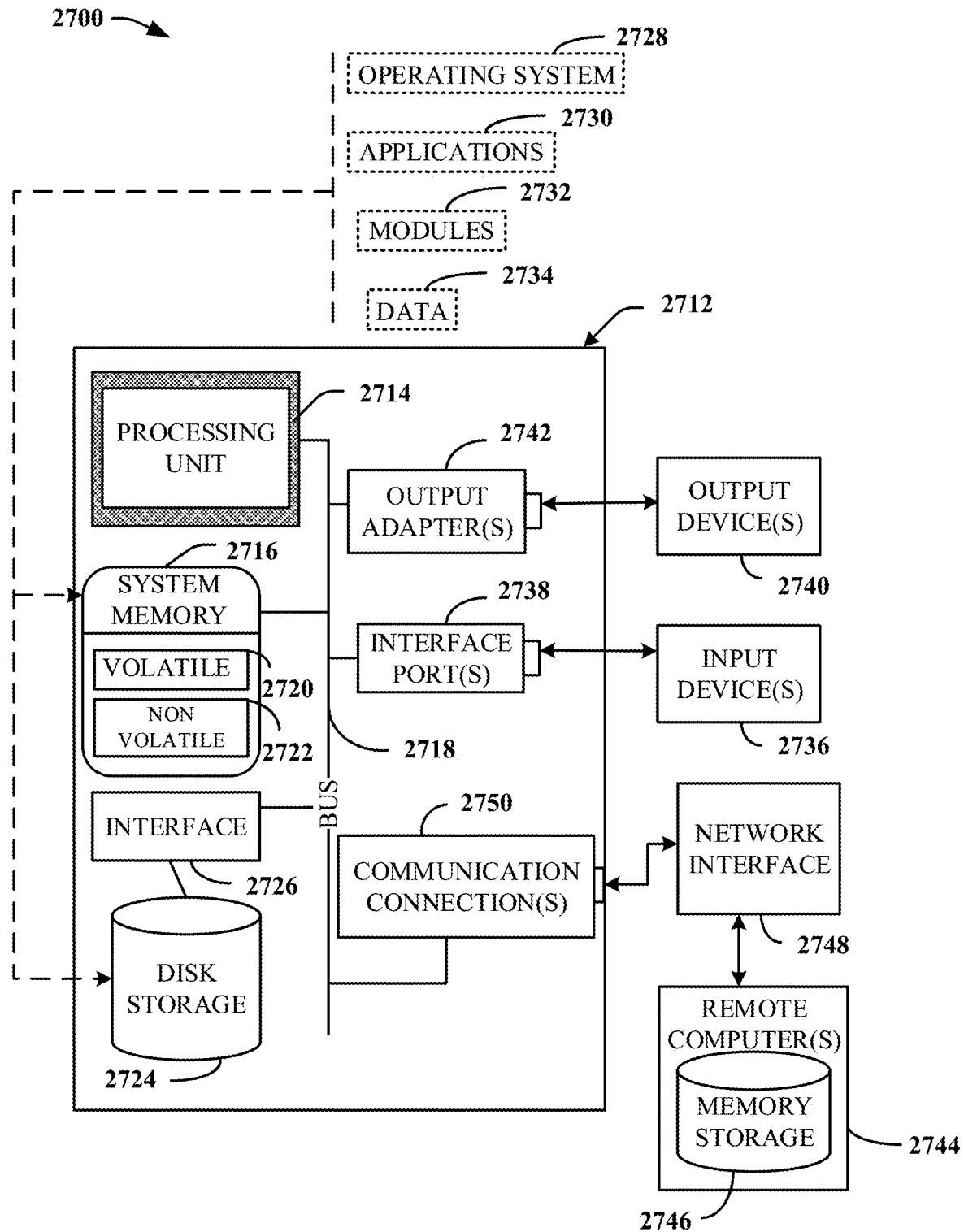
FIG. 27 illustrates a block diagram of an example, non-limiting operating environment in which one or more embodiments described herein can be facilitated.

In order to provide a context for the various aspects of the disclosed subject matter, FIG. 27 as well as the following discussion are intended to provide a general description of a suitable environment in which the various aspects of the disclosed subject matter can be implemented. FIG. 27 illustrates a suitable operating environment 2700 for implementing various aspects of this disclosure can also include a computer 2712. The computer 2712 can also include a processing unit 2714, a system memory 2716, and a system bus 2718. The system bus 2718 couples system components including, but not limited to, the system memory 2716 to the processing unit 2714. The processing unit 2714 can be any of various available processors. Dual microprocessors and other multiprocessor architectures also can be employed as the processing unit 2714. The system bus 2718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 2716 can also include volatile memory 2720 and nonvolatile memory 2722. The basic input/output system (BIOS), containing the basic routines to transfer information between elements within the computer 2712, such as during start-up, is stored in nonvolatile memory 2722. By way of illustration, and not limitation, nonvolatile memory 2722 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 2720 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 2712 can also include removable/non-removable, volatile/nonvolatile computer storage media. FIG. 27 illustrates, for example, a disk storage 2724. Disk storage 2724 can also include, but is not limited to, devices like a magnetic disk drive, floppy disk drive, tape drive, Jaz drive, Zip drive, LS-100 drive, flash memory card, or memory stick. The disk storage 2724 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2724 to the system bus 2718, a removable or non-removable interface is typically used, such as interface 2726. FIG. 27 also depicts software that acts as an intermediary between users and the basic computer resources described in the suitable operating environment 2700. Such software can also include, for example, an operating system 2728. Operating system 2728, which can be stored on disk storage 2724, acts to control and allocate resources of the computer 2712. System applications 2730 take advantage of the management of resources by operating system 2728 through program modules 2732 and program data 2734, e.g., stored either in system memory 2716 or on disk storage 2724. It is to be appreciated that this disclosure can be implemented with various operating systems or combinations of operating systems. A user enters commands or information into the computer 2712 through input device(s) 2736. Input devices 2736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2714 through the system bus 2718 via interface port(s) 2738. Interface port(s) 2738 include, for example, a serial port, a parallel port, a game port, and a universal serial bus (USB). Output device(s) 2740 use some of the same type of ports as input device(s) 2736. Thus, for example, a USB port can be used to provide input to computer 2712, and to output information from computer 2712 to an output device 2740. Output adapter 2742 is provided to illustrate that there are some output devices 2740 like monitors, speakers, and printers, among other output devices 2740, which require special adapters. The output adapters 2742 include, by way of illustration and not limitation, video and sound cards that provide a means of connection between the output device 2740 and the system bus 2718. It can be noted that other devices and/or systems of devices provide both input and output capabilities such as remote computer(s) 2744.

Computer 2712 can operate in a networked environment using logical connections to one or more remote computers, such as remote computer(s) 2744. The remote computer(s) 2744 can be a computer, a server, a router, a network PC, a workstation, a microprocessor-based appliance, a peer device or other common network node and the like, and typically can also include many or the elements described relative to computer 2712. For purposes of brevity, only a memory storage device 2746 is illustrated with remote computer(s) 2744. Remote computer(s) 2744 is logically connected to computer 2712 through a network interface 2748 and then physically connected via communication connection 2750. Network interface 2748 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 2750 refers to the hardware/software employed to connect the network interface 2748 to the system bus 2718. While communication connection 2750 is shown for illustrative clarity inside computer 2712, it can also be external to computer 2712. The hardware/software for connection to the network interface 2748 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory device that stores computer executable components; and
   a hardware processor that executes the computer-executable components stored in the memory device, wherein the computer executable components comprise:
   an entry component that generates an entry in a table, wherein the entry comprises bounds-information of an object allocated in a memory of the memory device;
   a re-purpose component that:
   determines unused bits of an object pointer specifying an address of the object, and
   writes, in the unused bits, an index to the entry in the table; and
   a check component that:
   intercepts an instruction comprising the object pointer,
   executes bounds-checking to validate the address according to the bounds-information by extracting the index from the object pointer to access the bounds-information for comparison against the address.

2. The system of claim 1, further comprising a propagation component that automatically propagates the index when subsequent addresses are derived via assignment statements or pointer arithmetic.

3. The system of claim 1, wherein the check component checks array bounds.

4. The system of claim 1, wherein the check component determines if an array reference is in-bounds or out-of-bounds, and mitigates occurrence of out-of-bounds array references.

5. The system of claim 1, wherein the re-purpose component utilizes the unused bits in the object pointer to track a range of memory addresses that can be accessed.

6. The system of claim 1, further comprising a propagation component that propagates extra information in the unused bits when the object pointer is copied in an assignment statement.

7. The system of claim 1, further comprising a propagation component that propagates extra information in the unused bits when the object pointer is passed as an argument in a function call.

8. The system of claim 1, further comprising a propagation component that propagates extra information in the unused bits when the object pointer is used to compute another address.

9. The system of claim 1, wherein a guard bit intervenes between index bits of the unused bits and address bits of the object pointer.

10. The system of claim 1, wherein the entry component manages the bounds-information stored in the table via a modification to a memory allocation function or a free library function.

11. The system of claim 1, wherein a subset of a group of bounds-information is stored in an overflow table when a number of active objects exceeds a size of the table or when a number of the unused bits that would be required to support the number of active objects exceeds a quantity of the unused bits in the object pointer.

12. The system of claim 11, wherein the check component executes the bounds-checking using a specified address to access the bounds-information within the subset when the unused bits include a value indicative of the overflow table.

13. A computer-implemented method, comprising:
generating, by a hardware processor, an entry in a table, wherein the entry comprises bounds-information of an object allocated in a memory of a memory device;
determining, by the hardware processor, unused bits of an object pointer specifying an address of the object;
writing, by the hardware processor, in the unused bits, an index to the entry in the table;
intercepting, by the hardware processor, an instruction comprising the object pointer; and
executing, by the hardware processor, bounds-checking to validate the address according to the bounds-information by extracting the index from the object pointer to access the bounds-information for comparison against the address.

14. The method of claim 13, further comprising automatically propagating, by the hardware processor, the index when subsequent addresses are derived via assignment statements or pointer arithmetic.

15. The method of claim 13, wherein the bounds-checking comprises checking, by the hardware processor, array bounds.

16. The method of claim 13, wherein the bounds-checking comprises determining, by the hardware processor, if an array reference is in-bounds or out-of-bounds.

17. The method of claim 16, wherein the bounds-checking comprises mitigating, by the hardware processor, occurrence of out-of-bounds array references.

18. The method of claim 13, further comprising employing, by the hardware processor, the un used bits in the object pointer to track of range of memory addresses that can be accessed.

19. The method of claim 13, further comprising propagating, by the hardware processor, extra information in the unused bits when the object pointer is copied in an assignment statement.

20. The method of claim 13, further comprising propagating, by the hardware processor, extra information in the unused bits when the object pointer is passed as an argument in a function call.

21. The method of claim 13, further comprising propagating, by the hardware processor, extra information in the unused bits when the object pointer is used to compute another address.

22. A computer program product comprising a non-transitory computer readable medium having program instructions embodied therewith, the program instructions executable by a hardware processor to cause the hardware processor to:
generate an entry in a table, wherein the entry comprises bounds-information of an object allocated in a memory of a memory device;
determine unused bits of an object pointer specifying an address of the object;
write, in the unused bits, an index to the entry in the table;
intercept an instruction comprising the object pointer; and
execute bounds-checking to validate the address according to the bounds-information by extracting the index from the object pointer to access the bounds-information for comparison against the address.

23. The computer program product of claim 22, wherein the instruction is a load instruction.

24. The computer program product of claim 22, wherein the instruction is a store instruction.

* * * * *